US007090120B2

(12) United States Patent
Ueda et al.

(10) Patent No.: US 7,090,120 B2

(45) Date of Patent: Aug. 15, 2006

(54) SHEET PUNCHING DEVICE AND IMAGE FORMING APPARATUS HAVING THE SAME

(75) Inventors: Noriyoshi Ueda, Kashiwa (JP); Nobutaka Uto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/654,986

(22) Filed: Sep. 5, 2003

(65) Prior Publication Data

US 2004/0045421 A1 Mar. 11, 2004

Related U.S. Application Data

(62) Division of application No. 09/617,539, filed on Jul. 14, 2000, now Pat. No. 6,672,504.

(30) Foreign Application Priority Data

Jul. 15, 1999 (JP) ................................ 11-201746

(51) Int. Cl.
*B23Q 15/14* (2006.01)

(52) U.S. Cl. ............................. 234/50; 83/74; 83/694; 83/684; 83/691; 83/76.7; 83/76.9; 83/549; 83/670; 83/687

(58) Field of Classification Search .................. 234/50; 83/670, 687, 691, 609, 690, 684, 688, 692, 83/694, 549, 304, 305, 663, 334, 335, 74, 83/76, 76.8, 76.7, 331, 343, 669, 76.9

See application file for complete search history.

(56) References Cited

U.S. PATENT DOCUMENTS

| | | | | |
|---|---|---|---|---|
| 2,761,513 | A | 9/1956 | Stram | 164/111 |
| 2,986,329 | A | 5/1961 | Tailleur | 234/50 |
| 3,171,315 | A | 3/1965 | Jahn | 83/331 |
| 3,827,321 | A | 8/1974 | Bley | 83/117 |
| 4,343,215 | A | 8/1982 | Fuchs | 83/670 |
| 5,669,277 | A | 9/1997 | Perrone | 83/37 |
| 5,746,162 | A | 5/1998 | Hosoi et al. | 123/58.09 |
| 5,887,502 | A | 3/1999 | Yamaguchi et al. | 83/76 |
| 5,911,414 | A | 6/1999 | Kato et al. | 270/58.07 |
| 6,065,383 | A | 5/2000 | Takaishi et al. | 83/368 |
| 6,241,234 | B1 * | 6/2001 | Saitoh et al. | 270/58.12 |
| 6,295,908 | B1 | 10/2001 | Holzhauser et al. | 83/76.9 |
| 6,305,262 | B1 | 10/2001 | Watanabe | 83/670 |
| 6,381,443 | B1 | 4/2002 | Kawata et al. | 399/407 |
| 6,386,080 | B1 * | 5/2002 | Okamoto et al. | 83/73 |

* cited by examiner

*Primary Examiner*—Boyer D. Ashley
*Assistant Examiner*—Omar Flores Sánchez
(74) *Attorney, Agent, or Firm*—Fitzpatrick, Cella, Harper & Scinto

(57) ABSTRACT

A sheet punching device that cuts holes in a sheet while punches are entering die holes, in which a plurality of punch trains along each of which a plurality of punches are aligned on a rotating shaft in parallel with the rotating shaft are disposed in the rotation direction of the rotating shaft, and the die holes are disposed in correspondence with the punches of the punch trains.

10 Claims, 29 Drawing Sheets

SHEET PUNCHING DEVICE AND IMAGE FORMING APPARATUS HAVING THE SAME

CROSS-REFERENCE TO RELATED APPLICATION

This application is a divisional of application Ser. No. 09/617,539, filed Jul. 14, 2000, now U.S. Pat. No. 6,672,504.

BACKGROUND OF THE INVENTION

1. Field of the Invention

The present invention relates to a sheet punching device for cutting a hole in a sheet, and an image forming apparatus, such as a copying machine, a printer, a facsimile machine, and a composite apparatus including the foregoing devices, provided with the sheet punching device.

2. Related Background Art

Up to now, a sheet punching device includes punches and dies of the number corresponding to the number of holes to be cut in a sheet and cuts the holes in the sheet while the punches are entering die holes, respectively.

However, the conventional sheet punching device is equipped with only the combination of the paired punches and dies of the same number as that of the holes to be cut in the sheet. For that reason, because the punches and the dies are quickly worn, the punches and the dies must be frequently replaced by new ones, resulting in a low efficiency of punching the sheet.

Also, because the number of holes to be cut in the sheet is different depending on the respective countries, if the conventional sheet punching device is adapted to a standard of some countries, it can not be adapted to a standard of other countries.

For example, in Japan, there are many cases in which two holes are cut in the sheet, and the sheet punching device that cuts two holes in the sheet cannot be adapted to such standard as of U.S.A. in which three holes are cut in the sheet.

Under the above circumstances, the operation of the sheet punching device is suspended and the punches and the dies must be replaced by new ones every time the number of holes is changed, thus degrading the punching efficiency.

Also, since an image forming apparatus with the conventional sheet punching device is low in the punching efficiency of the sheet punching device, the efficiency of forming an image on the sheet is low.

SUMMARY OF THE INVENTION

The present invention has been made to solve the above problems with the conventional device, and therefore an object of the present invention is to provide a sheet punching device which has high efficiency in punching and can be rapidly adapted to a change in the number of holes to be cut in the sheet, and an image forming apparatus with that sheet punching device.

In order to achieve the above object, according to the present invention, there is provided a sheet punching device that cuts holes in a sheet while punches are entering die holes, in which a plurality of punch trains along each of which a plurality of punches are aligned on a rotating shaft in parallel with the rotating shaft are disposed in the rotation direction of the rotating shaft, and the die holes are disposed in correspondence with the punches of the punch trains.

In the sheet punching device according to the present invention, the number of the punches is identical in each of a plurality of the punch trains, and the punches are disposed on the same positions in the rotation direction of the rotating shaft in each of the punch trains.

In the sheet punching device according to the present invention, the rotating shaft is rotatable in the same direction, and two punch trains are disposed on the rotating shaft at an angle of about 180° with respect to each other in the rotation direction, and the number of punches in each of the punch trains is two.

In the sheet punching device according to the present invention, the number of the punches on the punch trains is different in each of the punch trains.

In the sheet punching device according to the present invention, the rotating shaft is rotatable in the same direction, and two punch trains are disposed on the rotating shaft at an angle of about 180° with respect to each other in the rotation direction, and the number of the punches in one of those two punch trains is two, and the number of the punches in the other punch train is three.

According to the present invention, there is provided an image forming apparatus comprising: image forming means for forming an image on a sheet supplied from the sheet stacking means; and one of the above sheet punching devices for cutting a hole in the sheet on which the image has been formed by the image forming means.

In the sheet punching device of the present invention, since a plurality of punch trains along each of which a plurality of punches are aligned on a rotating shaft in parallel with the rotating shaft are disposed in the rotation direction of the rotating shaft, and the die holes are disposed in correspondence with the punches of the punch trains, if the number of punches is identical in each of the punch trains, and the punches are disposed on the same positions in the rotation direction of the rotating shaft in each of the punch trains, the number of combinations of the punches and the dies increases as many as the punch trains, and the abrasion of the punches and the dies is delayed. As a result, it is unnecessary to frequently replace the punches and the dies with new ones so that the efficiency of punching the sheet can be enhanced, as compared with the conventional device.

Also, if the number of punches on one of the punch trains is made different from that on another punch train, even if the number of holes to be cut in the sheet is changed, the number of holes to be cut in the sheet can be made different as many as the number of punch trains so as to be adaptive to various sheets. As a result, it is unnecessary to replace the punches and the dies with punches and dies of other types, and the efficiency of punching the sheet can be enhanced as much.

In the image forming apparatus according to the present invention, since there is provided the sheet punching device high in punching efficiency, the sheet can be conveyed onto the sheet punching device while a speed at which an image is formed on a sheet is accordingly improved, and the image processing efficiency with respect to the sheet is enhanced. The present invention is thus capable of improving the productivity.

BRIEF DESCRIPTION OF THE DRAWINGS

These and other objects, features and advantages of this invention will become more fully apparent from the following detailed description taken in conjunction with the accompanying drawings in which:

FIGS. 3A and 3B are diagrams for explanation of the operation of a three-fold treating portion, respectively, in which FIG. 3A is a diagram showing a state immediately before a sheet is folded into two, and FIG. 3B is a diagram showing a state where the sheet is being folded into two;

FIGS. 4A, 4B and 4C are diagrams for explanation of the operation of a three-fold treating portion, respectively, in which FIG. 4A is a diagram showing a state immediately before a sheet is folded into three, FIG. 4B is a diagram showing a state where the sheet starts to be folded into three, and FIG. 4C is a diagram showing a state where the sheet is folded into three and discharged;

DESCRIPTION OF THE PREFERRED EMBODIMENTS

Now, a description will be given in more detail of preferred embodiments of the present invention with reference to the accompanying drawings.

Figure 1:
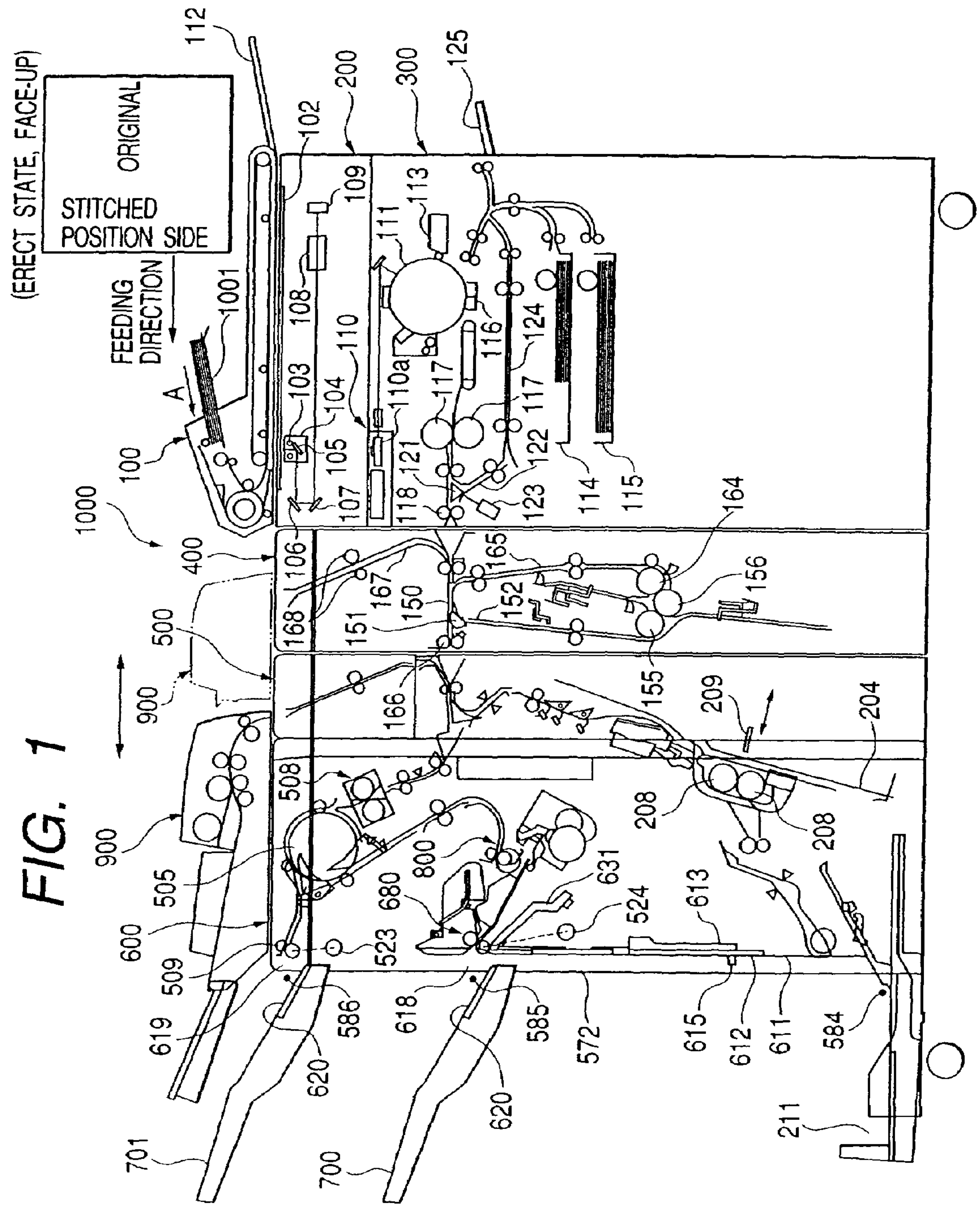
FIG. 1 is a front cross-sectional view showing the outline of a copying machine which is an embodiment of an image forming apparatus in accordance with the present invention.

FIG. 1 is a front cross-sectional view showing the outline of an internal structure of a copying machine 1000 in accordance with an embodiment of the present invention.

The copying machine 1000 includes an original feed portion 100, an image reader portion 200, an image forming unit 300, a three-fold treating portion 400 that folds a sheet into a Z-shape, a two-fold treating portion 500 that folds a sheet into two, a finisher 600, an inserter 900, and so on.

The sheet may be a plain paper, a thin resin sheet which is the substitute for the plain paper, a postcard, cardboard, a letter, a plastic thin plate or the like.

Figure 2:
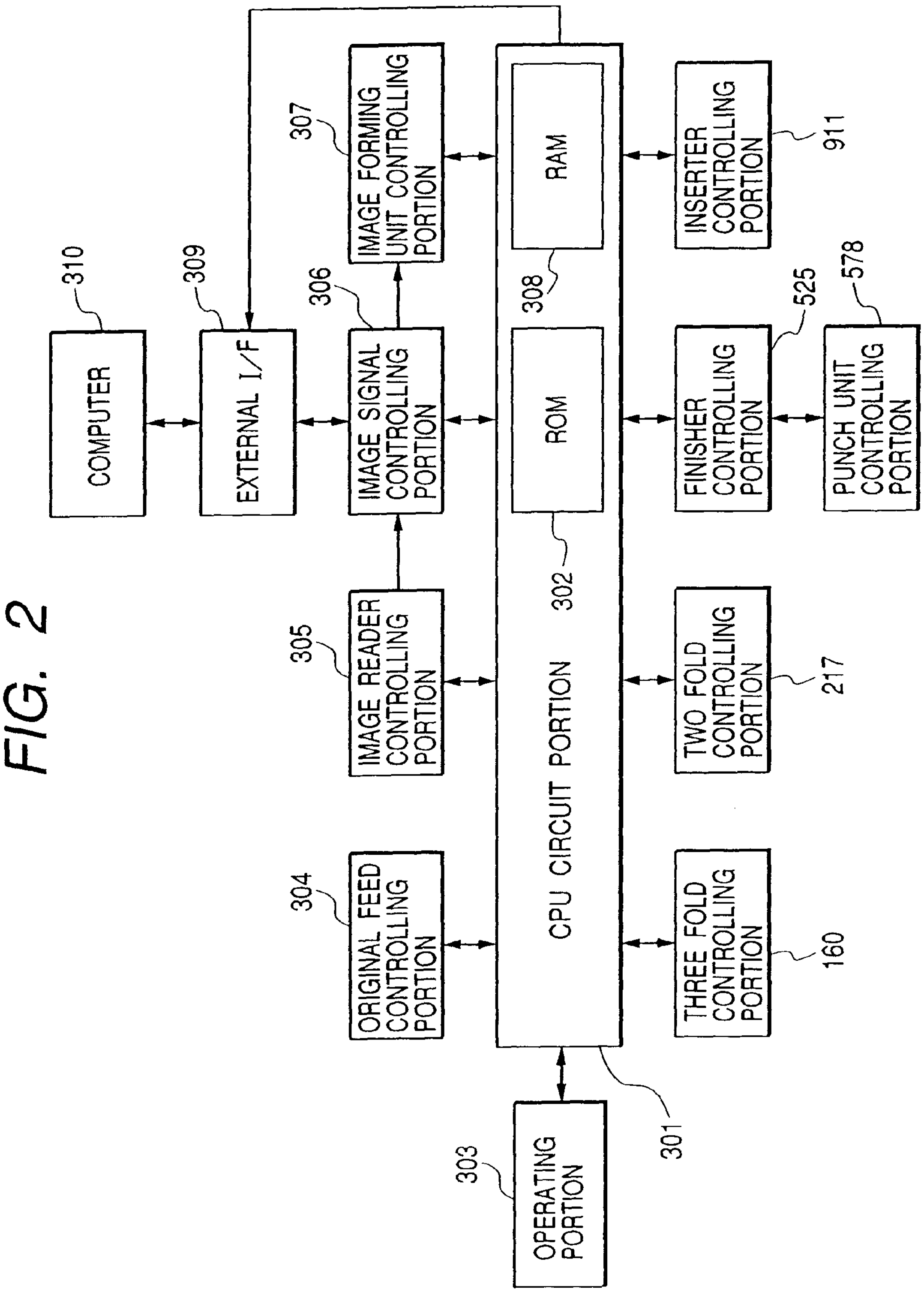
FIG. 2 is a block diagram illustrating the control of the entire copying machine.

FIG. 2 is a block diagram illustrating the control of the copying machine 1000.

A CPU circuit portion 301 includes a CPU (not shown) and is so designed as to control an original feed controlling portion 304, an image reader controlling portion 305, an image signal controlling portion 306, an image formation unit controlling portion 307, a three-fold controlling portion 160, a two-fold controlling portion 217, a finisher controlling portion 525, an inserter controlling portion 911 and so on in accordance with control program stored in a ROM 302 and with the setting of an operating portion 303.

The original feed controlling portion 304 controls the original feed portion 100, the image reader controlling portion 305 controls the image reader portion 200, the image formation unit controlling portion 307 controls the image forming unit 300, and the three-fold controlling portion 160 controls the three-fold treating portion 400. Also, the two-fold controlling portion 217 controls the two-fold treating portion 500, the finisher controlling portion 525 controls the finisher 600 and the inserter controlling portion 911 controls the inserter 900.

The operating portion 303 includes a plurality of keys for setting various functions pertaining to image formation, a display portion that displays the setting state, etc. The operating portion 303 also outputs a key signal corresponding to the respective key operation by a user to the CPU circuit portion 301, and displays corresponding information on the display portion on the basis of the signal from the CPU circuit portion 301.

The RAM 308 is used as a region in which control data is temporarily held and as a region for a calculating operation accompanying to control. An external I/F 309 is an interface between the copying machine 1000 and an external computer 310, and is so designed as to develop print data from the computer 310 into a bit map image and output the image to the image signal controlling portion 306 as image data.

Also, an image of the original read by an image sensor 109 is outputted from the image reader controlling portion 305 to the image signal controlling portion 306.

The image formation unit controlling portion 307 is so designed as to output the image data from the image signal controlling portion 306 to an exposure control portion 110.

(Original Feed Portion 100 and Image Reader Portion 200)

Referring to FIG. 1, it is assumed that an original is set on a tray 1001 of the original feed portion 100 in an erect state and a face-up state (a face on which an image has been formed is upward) when being viewed from the user. It is assumed that the original binding position is positioned on the left end portion of the original.

The originals set on the tray 1001 are conveyed one by one in order starting from the front page leftward (in a direction indicated by an arrow A in FIG. 1), that is, with the binding position as a leading end, by the original feed portion 100. Then, each of the originals is conveyed on a platen glass 102 through a curved path from the left side toward the right side, and thereafter discharged onto a sheet discharge tray 112.

In this situation, a scanner unit 104 is held in a given position, and the original passes through the scanner unit 104 from the left side to the right side, to thereby conduct an original reading process. In the present specification, the above-described reading method is called "original flow-reading".

When the original passes through the platen glass 102, the original is irradiated with a lamp 103 of the scanner unit 104, and the reflected light from the original is guided to the image sensor 109 through mirrors 105, 106, 107 and a lens 108.

In another method, the original conveyed by the original feed portion 100 is allowed to stop on the platen glass 102 once, and in this state, the scanner unit 4 is shifted from the left side to the right side to thereby conduct the original reading process. In the present specification, this reading method is called "original fixed-reading".

In the case where the original is read without using the original feed portion 100, the user lifts the original feed portion 100 and sets an original on the platen glass 102. In this case, the above-described original fixed-reading is conducted.

(Image Forming Unit)

The image data of the original read by the image sensor 109 is subjected to given image processing and then transmitted to the exposure control portion 110. The exposure control portion 110 outputs a laser beam in response to the image signal. The laser beam is irradiated onto a photosensitive drum 111 while being scanned by a polygon mirror 110*a*. An electrostatic latent image is formed on the photosensitive drum 111 in accordance with the scanned laser beam.

An electrostatic latent image formed on the photosensitive drum 111 is developed by a developing device 113 and visualized as a toner image. On the other hand, the sheet is conveyed to a transfer portion 116 from any one of cassettes 114, 115, a manual sheet feed portion 125 and a duplex conveying path 124.

Then, the visualized toner image is transferred onto the sheet in the transfer portion 116. The sheet to which the toner image has been transferred is subjected to a fixing process in a fixing portion 117.

Thereafter, the sheet that has passed through the fixing portion 117 is guided to a path 122 once while rotating a flapper 121 by the actuation of a plunger 123. Then, after a trailing end of the sheet has passed through the flapper 121, the sheet is switched back and conveyed to a pair of discharge rollers 118 by the flapper 121. Then, the sheet is discharged from the image forming unit 300 by the pair of discharge rollers 118.

As a result, the sheet can be discharged from the image forming unit 300 with the surface on which the toner image has been formed being faced downwardly (face-down). In the present specification, this state is called "surface reverse discharge".

When the image forming process is conducted in order starting from the top page by discharging the sheet to the outside of the device in the face-down state as described above, for example, in the case where the image forming process is conducted by using the original feed portion 100, or in the case where the image forming process is conducted with respect to the image data from a computer, the sheets can be arranged in the order of pages.

In the case where the image forming process is conducted on a hard sheet such as an OHP sheet which is conveyed from the manual feed portion 125, the sheet is discharged with the surface on which the toner image has been formed being faced upwardly (face-up) from the image forming unit 300 by the pair of discharge rollers 118 without guiding the sheet to the path 122.

Also, in the case where the image forming process is conducted on both surfaces of the sheet, the sheet is guided straight to the pair of discharge rollers 118 from the fixing portion 117, and the sheet is switched back immediately after the trailing end of the sheet has passed through the flapper 121 to thereby guide the sheet to the duplex feed path by the flapper 121.

However, there is a case in which the sheet is curled while the sheet is switched back by the flapper 121 at the time of the surface reverse discharge of the sheet. For example, the sheet may be curled and deformed into an upward curl shape (U-shape) in some cases.

In this case, the sheet that has been discharged to the sample tray 701 or the stack tray 700 of the finisher 600 by passing the three-fold treating portion 400 and the two-fold treating portion 500 without being subjected to any processing is deformed into the upward curl shape which obstructs a sheet to be subsequently discharged.

Under the above-described circumstance, the sheet that has reached a pair of discharge rollers 509 of the sample tray 701 or a pair of discharge rollers 680 of the stack tray 700 is discharged at a speed higher than a speed in the case where the surface reverse discharge is not conducted, to prevent the sheet jamming when the sheet is discharged.

In order to discharge the sheet at the higher speed than that when the surface reverse discharge is not conducted, when the plunger 123 conducts the surface reverse discharge operation, the finisher controlling portion 525 which will be described later controls, at high rotation speeds, a motor 523 for the pair of discharge rollers which rotate the discharge roller pair 509 of the sample tray 701 or a motor 524 for the pair of discharge rollers which rotates the pair of discharge rollers 680 of the stack tray 700, to thereby discharge the sheet at a high speed.

The sheet discharge speed when the sheet is not reversed is about 350 mm/s whereas the sheet discharge speed when the sheet is reversed is about 450 mm/s.

Although the sheet is curled in the U-shape in the above-described copying machine, the sheet jamming can be prevented in the case where the sheet is curled in the inverse U-shape (in this case, called "downward curl") similarly.

Also, there is a copying machine in which when the sheet is curled into the downward curl or the upward curl by heat and reverted, the sheet is curled in a reverse direction of the previous curl to cancel the previous curl.

In this copying machine, because the sheet discharged without being reversed is curled, the sheet discharge speed when the sheet is discharged without being reversed is made higher than the sheet discharge speed when the sheet is discharged while being reversed. This copying machine thus prevents the sheet jamming.

There is a case in which the sheet is curled also when the sheet passes through the three-fold treating portion 400, the two-fold treating portion 500, the inserter 900 which will be described later, and so on. In addition, the sheet may also be curled when the sheet passes through the interior of the finisher 600. The present invention can similarly cope with those cases.

(Three-Fold Treating Portion 400)

Referring to FIG. 1, a sheet discharged from the image forming unit 300 by the pair of discharge rollers 118 is conveyed to a conveying path 150 of the three-fold treating portion 400. The three-fold treating portion 400 conducts the three-fold treatment so as to fold the sheet into a Z-shape. For example, in the case where a sheet of A3 size or B4 size is employed and the designation of the fold treatment has been made by the operating portion 303 (refer to FIG. 2), the fold treatment is conducted on the sheet discharged from the image forming unit 300.

On the other hand, in other cases, the sheet discharged from the image forming unit 300 is conveyed to the two-fold treating portion 500 without being subjected to the fold treatment or is allowed to pass through the two-fold treating portion 500 without being subjected to any processing, and then conveyed to the finisher 600 as it is.

Figure 3A:
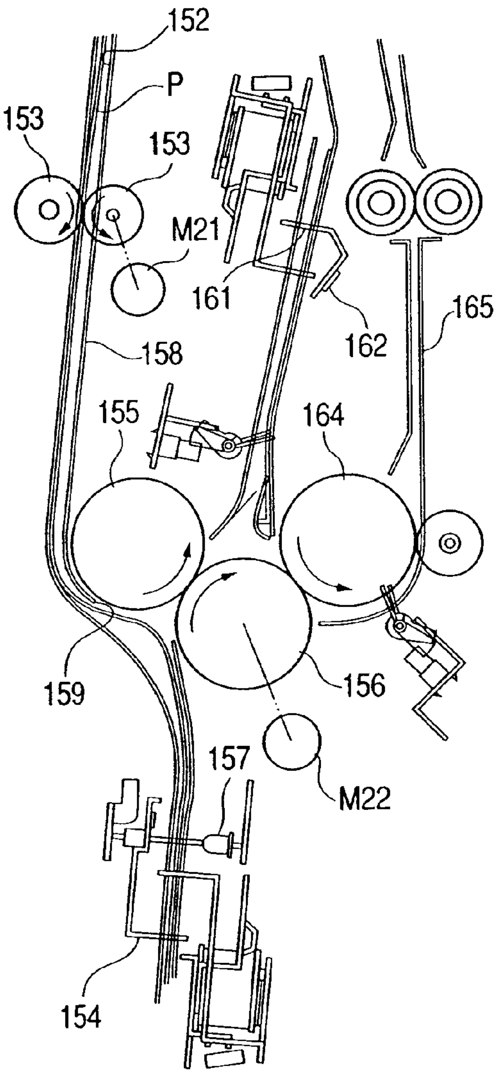

In the three-fold treating portion 400, the sheet which will be subjected to the three-fold treatment is guided to a receiving and conveying path 152 shown in FIG. 3A by a flapper 151, conveyed by a pair of conveying rollers 153 and received by a sheet leading end receiving stopper 154.

In this situation, if the sheet collides with force against the sheet leading and receiving stopper 154 and vibrates or jumps up and down so as to be skewed thereon, when the sheet is folded by first and second fold rollers 155 and 156, the sheet cannot be folded parallel with the fold and the leading end of the sheet. As a result, in some cases, the sheet may be wrinkled or the sheets cannot be aligned at their sides. Thus, one side of the sheet does not coincide with the other side of the sheet, resulting in a problem of an ensuing sheet conveyance to cause jamming.

Under the above-described circumstances, in order that the conveyed sheet is prevented from jumping up and down on the sheet leading end receiving stopper 154, when the leading end of the sheet reaches a certain portion upstream of the sheet leading end receiving stopper 154, the leading end of the sheet is detected by a sheet leading end detecting sensor 157, and the three-fold controlling portion 160 (refer to FIG. 5) controls the conveying motor M21 that rotates the conveying rollers 153 so that the sheet stops for the first time. After a given period of time elapses, the three-fold controlling portion 160 controls the conveying motor M21 to start the conveyance of the sheet (first time start), thereby abutting the leading end of the sheet against the sheet leading end receiving stopper 154.

As a result, the sheet is gently grounded on the sheet leading end receiving stopper 154 without jumping up and down on the sheet leading end receiving stopper 154.

Thereafter, the pair of conveying rollers 153 continue to convey the sheet by the conveying motor M21 that rotates at its original rotating speed while the leading end of the sheet P is abutted against the sheet leading end receiving stopper 154. The sheet is projected from an opening portion 159 of a guide wall 158 and approaches a nip portion of the first and second fold rollers 155 and 156 in a buckled state.

When the sheet approaches the nip portion, the three-fold controlling portion 160 controls the conveying motor M21 so that the sheets stops for the second time and starts for the second time after the vibration of a looped-portion of the sheet is subsided. The looped portion is thus conveyed to the nip portion in a stable state. The timing of the second time stop of the conveying motor M21 is conducted on the basis of the r.p.m. of the conveying motor M21 since the first time start of the sheet made by the conveying motor M21. As described above, the motor conducts the first time start after the sheet leading end has been detected by the sheet leading end detecting sensor 157 in advance of abutting of the sheet leading end against the sheet leading end receiving stopper 154.

In this embodiment, when the sheet approaches the sheet leading end receiving stopper 154 or the nip portion, the conveying motor M21 is stopped once (first and second time stops of the sheet). Alternatively, the conveying motor M21 may be rotated at a reduced speed.

Accordingly, since the sheet is conveyed at a reduced speed or stopped once immediately before the sheet is abutted against the sheet leading end receiving stopper 154 and immediately before the sheet is conveyed to the nip portion of the first and second fold rollers 155 and 156, the sheet is accurately folded into two without being wrinkled.

Figure 3B:
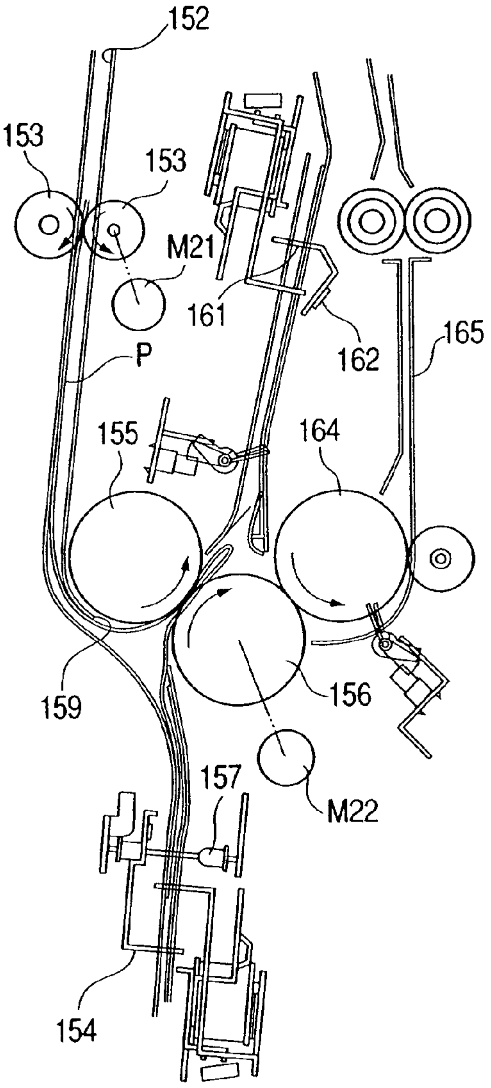

Thereafter, as shown in FIG. 3B, the first and second fold rollers 155 and 156 fold the sheet P into two and convey the sheet P. The sheet fold end is detected by a sheet fold end detecting sensor 162 immediately before the sheet fold end is abutted against a sheet fold end receiving stopper 161, and the three-fold controlling portion 160 (refer to FIG. 5) controls a fold drive motor M22 that drives the second fold roller 156 so that the sheet stops for the third time. As a result, the sheet fold end is gently abutted against the sheet fold end receiving stopper 161 by the inertia rotation of the fold rollers 156 and 159 so that there is no case in which the sheet fold end is skewed with respect to the sheet fold end receiving stopper 161 or jumps up and down.

The fold drive motor M22 is so designed as to rotate the three-fold rollers 156, 159 and 164.

Figures 4A, 4B, 4C:
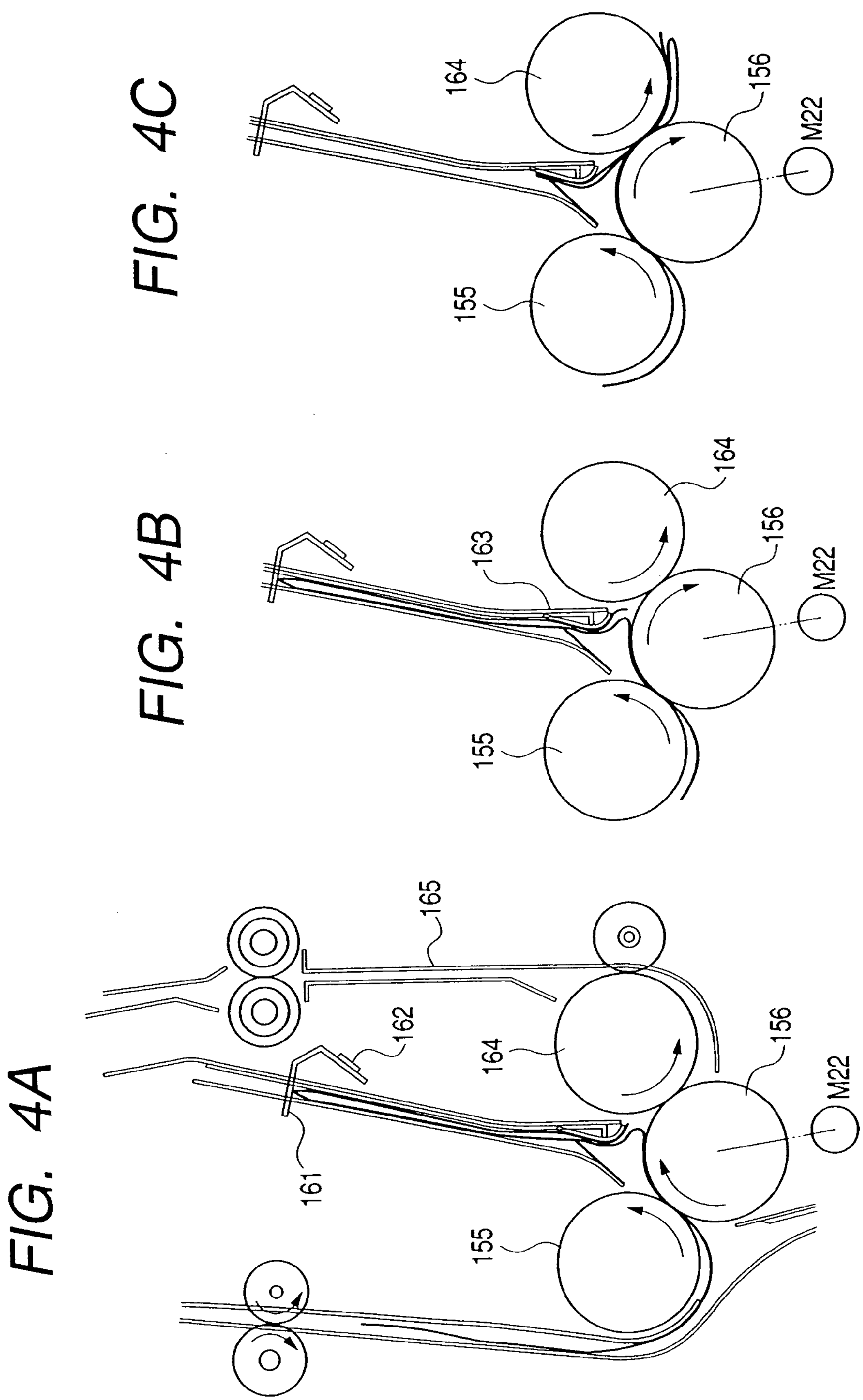

Then, as shown in FIG. 4A, after the sheet fold end is abutted against the sheet fold end receiving stopper 161, the three fold controlling portion 160 controls the fold drive motor M22 so that the third time start of the sheet is made. The third time start is conducted after a given period of time since the sheet fold end detecting sensor 162 has detected the sheet fold end as described above.

In this embodiment, when the sheet approaches the sheet fold end receiving stopper 161, the conveying motor M22 is stopped to stop the sheet for the third time. Alternatively, the conveying motor M22 may be rotated at a reduced speed.

Thereafter, as shown in FIG. 4B, a part of the sheet opposite to the lower end of a fold guide 163 begins to buckle, and that part is deformed into a loop shape and approaches the nip portion of the second and third fold rollers 156 and 164 together with the part of the sheet which has already been folded into two.

When the looped part approaches the nip portion of the second and third fold rollers 156 and 164 to some degree, the three-fold controlling portion 160 controls the fold drive motor M22 so that the sheet stops for the fourth time. As a result, the vibration of the looped portion is subsided. The fold drive motor M22 stops rotating in order to stop the sheet for the fourth time after a given period of time since the fold drive motor M22 has been started to start the sheet for the third time.

After the fold drive motor M22 has stopped rotating to conduct the fourth time stop of the sheet, a given period of time must elapse before the fold drive motor M22 is started to start the sheet for the fourth time. Upon the fourth time start, the looped portion of the sheet enters the second and third fold rollers 156 and 164. As a result, the sheet is accurately folded into three without being wrinkled, and is discharged from the second and third fold rollers 156 and 164.

Thereafter, the sheet is conveyed to the two-fold treating portion 500 through a delivery conveying path 165 shown in FIGS. 1, 3A and 3B by a pair of discharge rollers 166 shown in FIG. 1.

Figure 5:
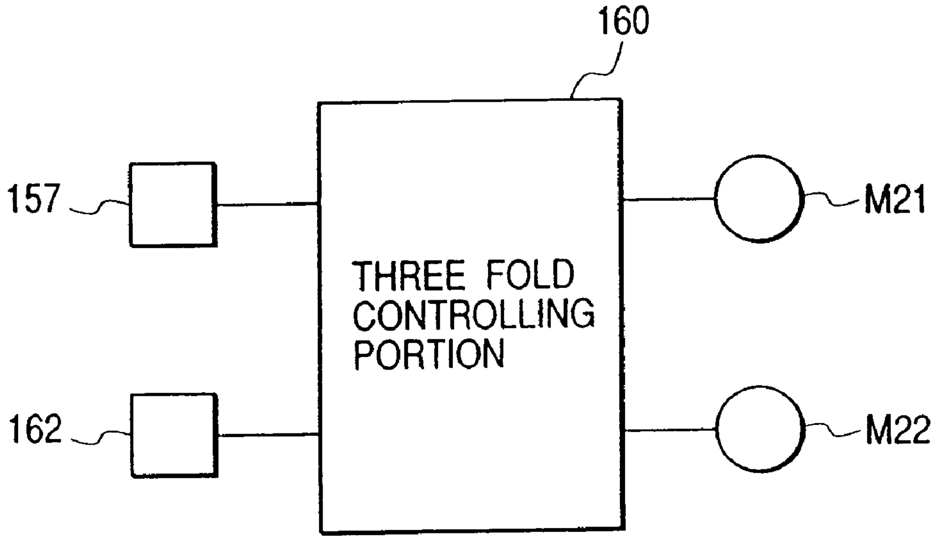
FIG. 5 is a block diagram illustrating the control of the three-fold treating portion.

The above operation is automatically conducted by the three-fold controlling portion 160 shown in FIG. 5.

In the operation of the above three-fold treating portion 400, the sheet is stopped and started four times in total. However, the sheet can be accurately folded without being wrinkled even if only the fourth time stop and start is conducted.

Also, the sheet fold end detecting sensor 162 is not always necessary, and the sheet fold control can be conducted while requiring only one sensor, i.e., the sheet leading end detecting sensor 157.

In that case, when to stop the fold drive motor M22 to conduct the third and fourth time stop of the sheet is determined on the basis of the time when, after the sheet has been abutted against the sheet leading end receiving stopper 154, the sheet leading end detecting sensor 157 detects the departure of the trailing end of the sheet (a portion which has been the leading end up to then) from the sheet leading end receiving stopper 154.

The three-fold treating portion 400 includes an auxiliary conveying path 167 connected to the receiving and conveying path 152 and a pair of auxiliary conveying rollers 168 so that the three-fold treating portion 400 can receive the sheet also from the inserter 900, which will be described later, and fold the received sheet into three as shown in FIG. 1.

In the above three-fold treating portion 400, the sheet can be accurately folded if the first- to third-fold rollers 155, 156 and 164 nip the sheet at the nip portion after the entire widthwise of the sheet is firmly brought into close contact with two rollers.

In order to achieve the above-described close contact, if the coefficient of friction of the first- to third-fold rollers 155, 156 and 164 with respect to the sheet is too large, there is a fear that the rollers draw the sheet in before the entire widthwise of the sheet is brought into close contact with the rollers, and therefore the coefficient of friction of the first- to third-fold rollers 155, 156 and 164 with respect to the sheet needs to be small.

If the coefficient of friction of the first- to third-fold rollers 155, 156 and 164 with respect to the sheet is made small, when the rollers start to nip the sheet, the rollers slip on the sheet making it difficult for the rollers to draw the sheet in.

Accordingly, because the sheet is pushed into the nip portion after the sheet is pushed in between and pressed against the rollers and the entire widthwise of the sheet is brought into close contact with the rollers, the sheet is accurately folded into three without being wrinkled.

Specifically, it is preferable that the coefficient of friction of the respective rollers is in a range of about 0.7 to about 0.8. More desirably, the coefficient of friction of the third-fold roller is about 0.6. In this case, for example, if silicon oil is applied to the surface of a rubber roller, the above coefficient of friction is obtained. It is needless to say that the above coefficient of friction is obtained by altering the material or the surface roughness of the roller.

Figure 6:
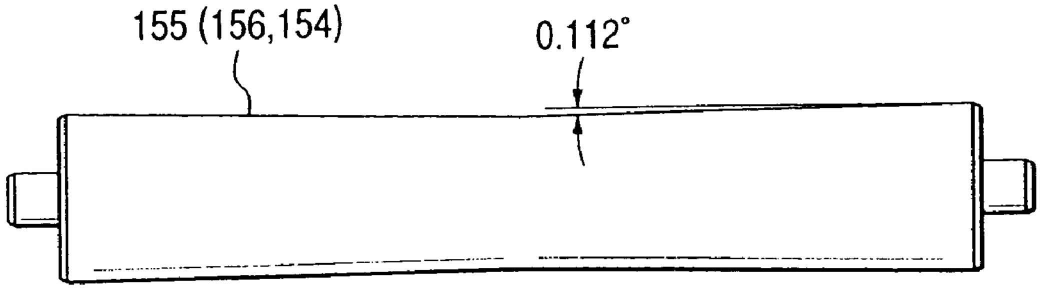
FIG. 6 is a diagram showing a roller in a three-fold treating portion in accordance with another embodiment of the present invention.

In addition, as shown in FIG. 6, if the rollers are made of CR (neoprene) rubber about 70 degrees to about 90 degrees in hardness and the diameter of the center portion of the roller is set to be smaller than the diameter of the end portions thereof so as to provide a down slope from the end portions of the roller toward the center portion thereof with about 0.112°, the rollers convey the sheet while stretching the sheet widthwise between both ends of the rollers. The sheet is thus accurately folded without being wrinkled. The above hardness values are based on JIS K6301.

Figure 7:
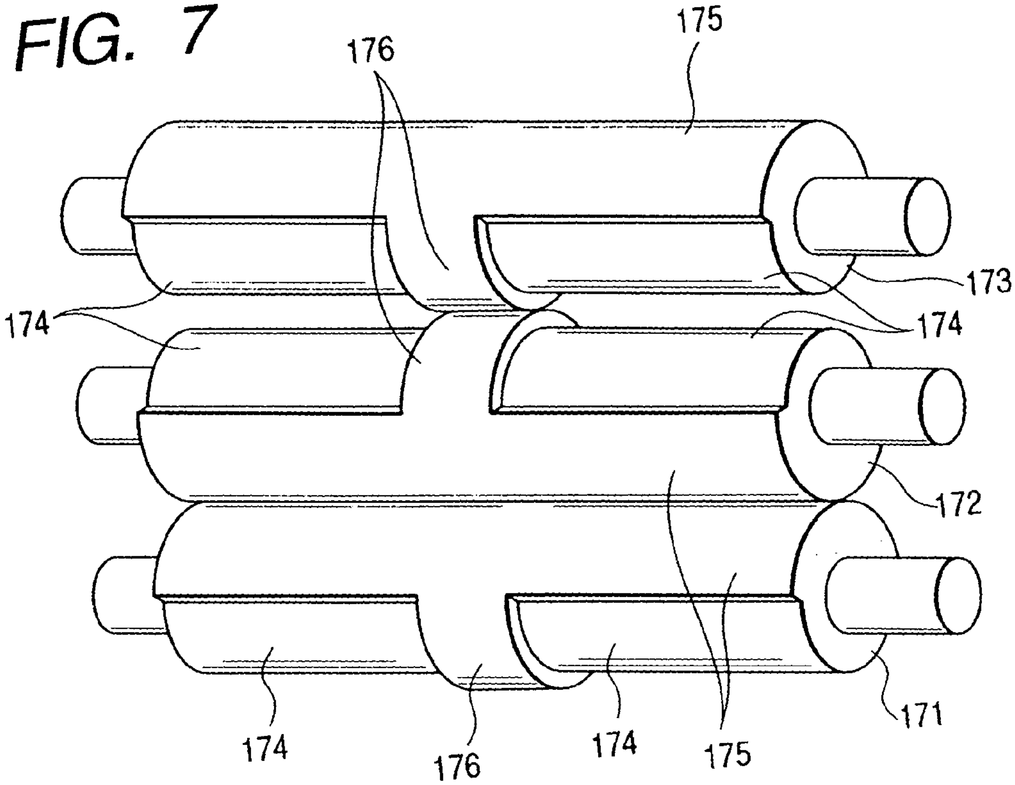
FIG. 7 is a perspective view showing rollers in a three-fold treating portion in accordance with still another embodiment of the present invention.
Figure 8:
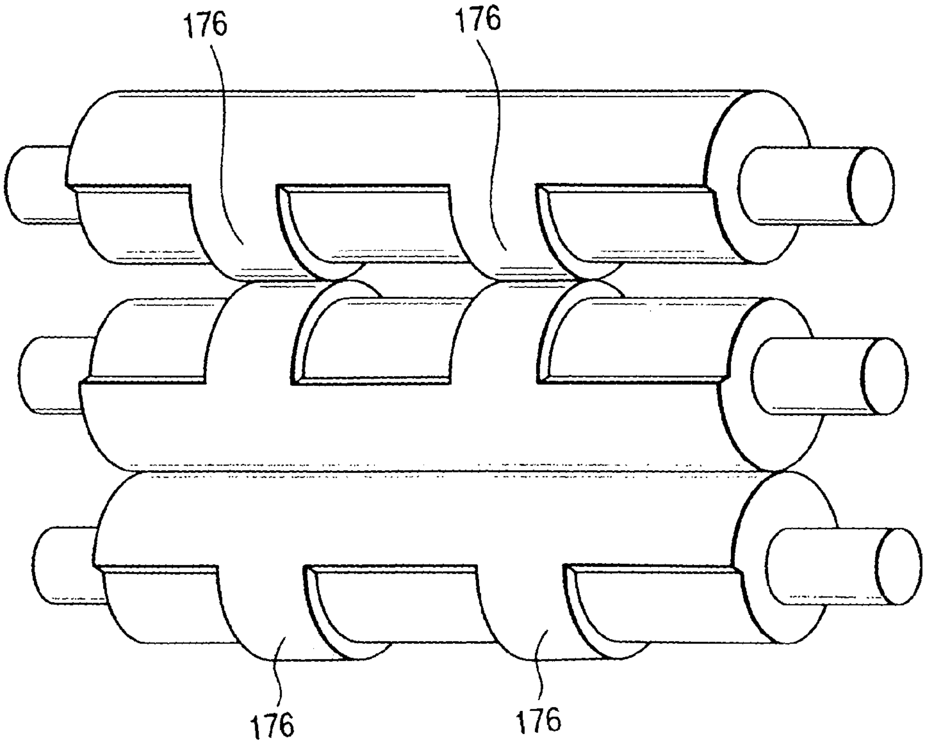
FIG. 8 is a perspective view showing rollers in a three-fold treating portion in accordance with yet still another embodiment of the present invention.
Figure 9:
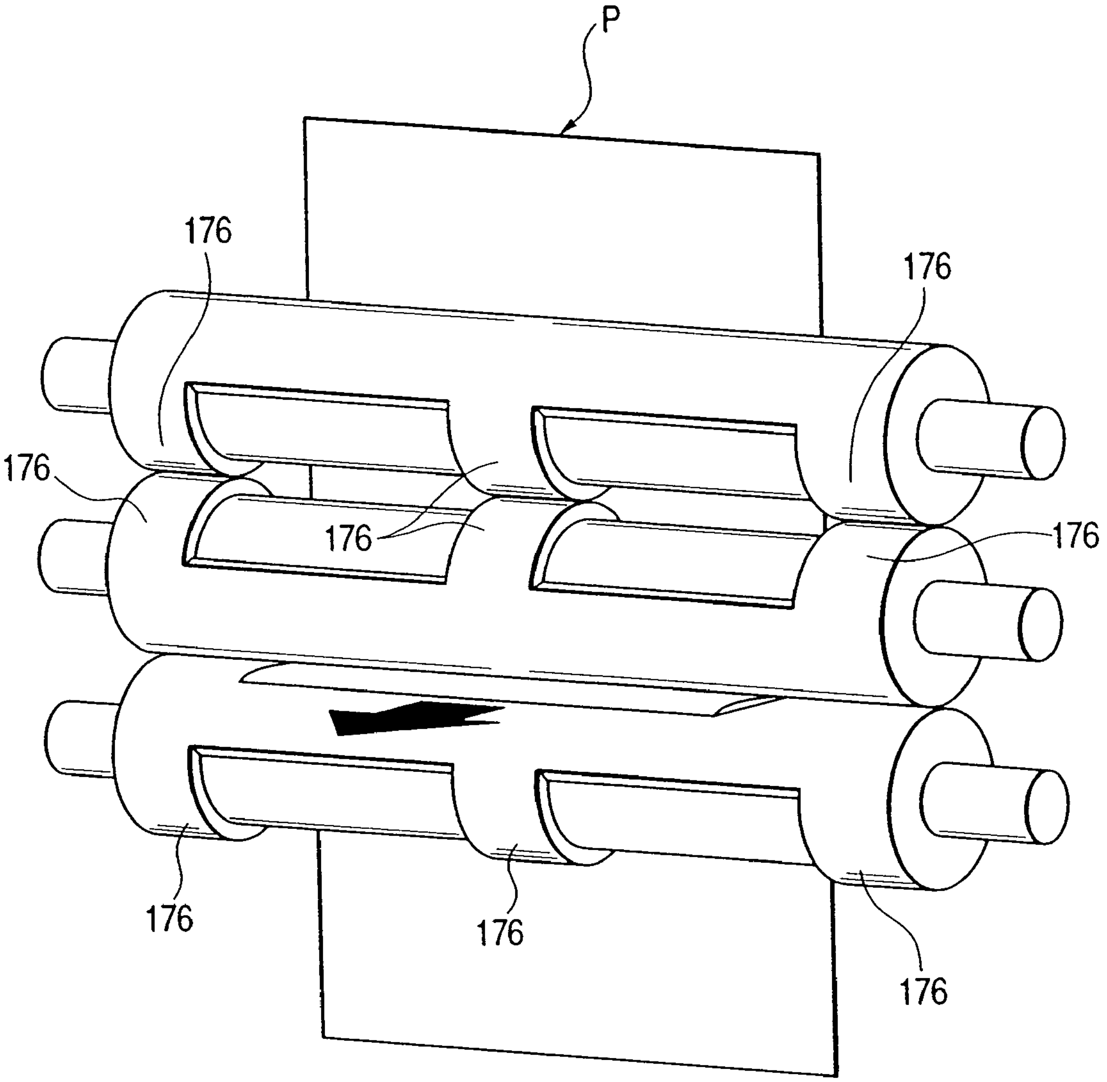
FIG. 9 is a perspective view showing rollers in a three-fold treating portion in accordance with yet still another embodiment of the present invention.

Also, as shown in FIGS. 7 to 9, relieved portions 174 are formed on the outer periphery of the first to third rollers 171, 172 and 173 except for portions in a direction that is in parallel with the axis of the rollers and in a rotation direction. With this structure, when the rollers start to nip the sheet, the sheet is nipped by axial remaining portions 175 in the parallel direction to the axis of the roller which are left by the relieved portions 174, and if rotation direction remaining portions 176 in the rotation direction of the roller which are left by the relieved portions 174 nip and convey the sheet during the rotation of the rollers, because the sheet is not nipped and conveyed by the entire rolls, the sheet is not wrinkled during conveyance of the sheet.

The number of the rotation direction remaining portions 176 shown in FIG. 7 is one in FIG. 7 and two in FIG. 8, and is not limited. Also, as shown in FIG. 9, three rotation direction remaining portions may be formed so that a center remaining portion nips and conveys the sheet, and left and right end remaining portions are brought in direct contact with another left and right remaining portions, respectively, to thereby prevent the rollers from slanting.

Also, the relieved portions may be formed on one of those rollers. In this case, when a pair of rollers begin to rotate, the sheet is nipped and folded between the axial remaining portions parallel to the axis of the roller, which are left by the relieved portions, and the other roller and, during the pair of rollers rotate, the sheet is nipped and conveyed between the rotation direction remaining portions 176 in the rotation direction of the roller, which are left by the relieved portions 174, and the other roller.

(Two-Fold Treating Portion 500)

Figure 10:
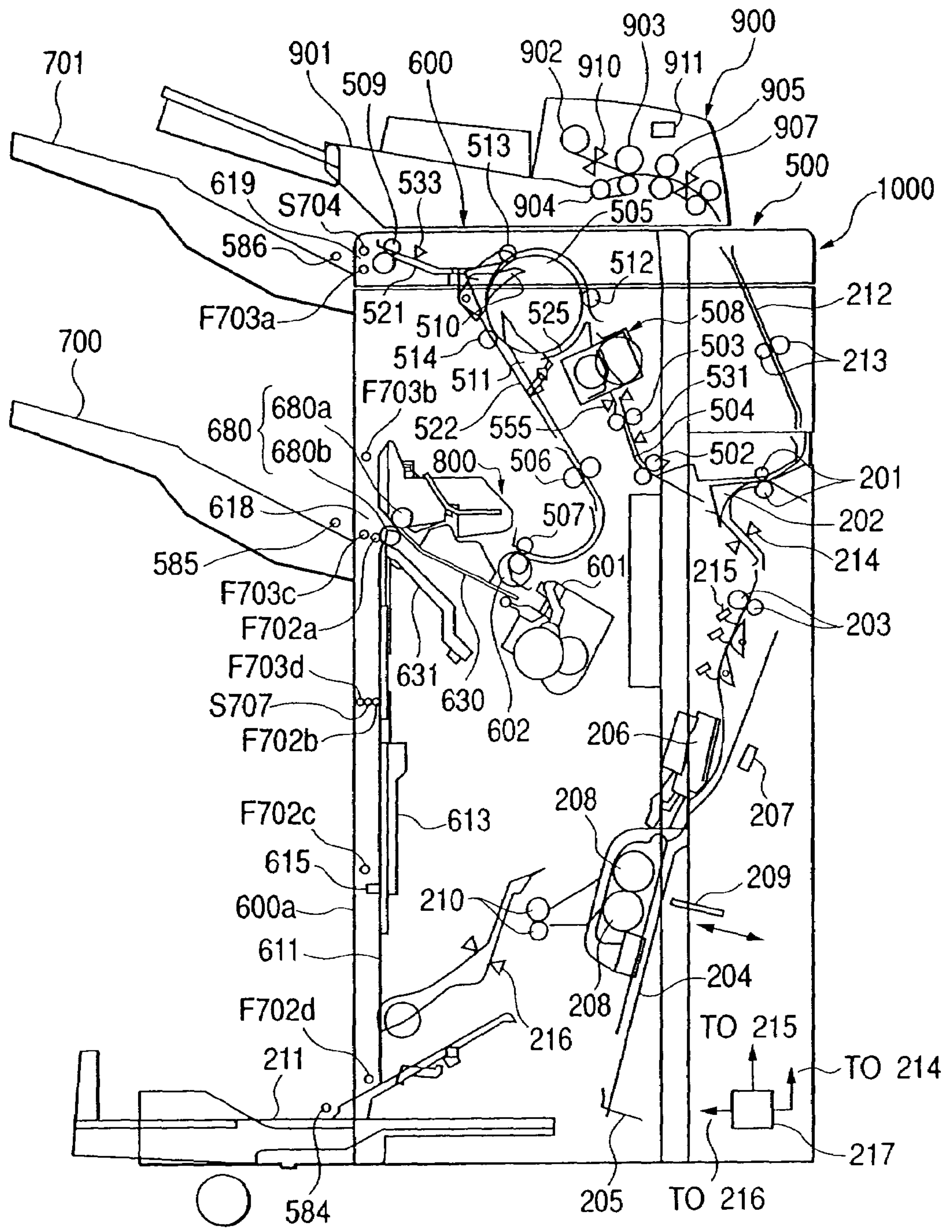
FIG. 10 is a front view showing the outline of a two-fold treating portion and a finisher.

Referring to FIG. 10, the two-fold treating portion 500 binds the sheets that have passed through the three-fold treating portion 400 (refer to FIG. 1) without being subjected to any processing into a sheet bundle on the basis of an instruction given from the operating portion 303 (refer to FIG. 2), or folds the sheets into two without binding them, and discharges the sheets to the outside of the copying machine 1000.

The sheets that have passed through the three-fold treating portion 400 without being subjected to any processing are conveyed between two inlet rollers 201, guided by a flapper 202 and received in a receiving guide 204 through two conveying rollers 203. If the sheet is not subjected to a process of folding the sheet into two in the two-fold treating portion 500, the flapper 202 guides the sheet to the finisher 600.

A given number of sheets conveyed by the conveying rollers 203 are sequentially conveyed until the leading end of each sheet comes in contact with a movable sheet positioning member 205, and then collected into a bundle by the sheet positioning member 205.

Also, two pairs of staplers 206 are disposed downstream of the conveying rollers 203, that is, on the way to the receiving guide 204, and an anvil 207 is disposed opposite to the staplers 206. The staplers 206 are so adapted as to bind the center of the sheet bundle in cooperation with the anvil 207.

A pair of fold rollers 208 are disposed downstream of the staplers 206, and a projection member 209 is disposed at a position opposite to the pair of fold rollers 208. The projection member 209 is projected toward the sheet bundle received in the receiving guide 204 with the result that the sheet bundle is pushed in between the pair of fold rollers 208 and folded by the pair of fold rollers 208. Then, the sheet bundle is discharged to a sheet discharge tray 211 through sheet discharge rollers 210.

Also, in the case where the sheet bundle bound by the staplers 206 is folded, the sheet positioning member 205 is brought down from a location where it has been when the staple processing is conducted by a given distance in accordance with the size of the sheet so that the staple position of the sheet bundle comes to the center position (nip point) of the pair of fold rollers 208 after the staple processing has been completed. As a result, the sheet bundle can be folded with the position where the staple processing is conducted as the center.

As in the three-fold treating portion 400, the two-fold treating portion 500 includes an auxiliary conveying path 212 connected to the inlet roller 201, and two auxiliary conveying rollers 213, so as to receive the sheet also from the inserter 900, which will be described later, and fold the sheet into two, or to convey the sheet to the finisher 600 without folding the sheet into two.

The inlet of the two-fold treating portion 500 is equipped with an inlet sensor 214 that detects the entrance of the sheet, and a sheet size detecting sensor 215 that detects the size of the passing sheet is disposed downstream of the conveying roller 203. Also, a discharge sensor 216 that detects the discharge of the sheet bundle is disposed in the vicinity of an outlet.

The two-fold treating portion 500 is so designed as to be controlled by the two-fold controlling portion 217 shown in FIG. 10.

(Inserter 900)

Referring to FIG. 10, the inserter 900 is employed to supply, for example, a sheet for a cover page without passing the sheet through the image forming unit 300.

The sheet bundle loaded on a tray 901 is conveyed to a separating portion made up of the conveying roller 903 and a separating belt 904 through a sheet feed roller 902. Then, the sheets are separated one by one from the topmost sheet by the conveying roller 903 and the separating belt 904. Then, the separated sheet is conveyed to the auxiliary conveying path 212 of the two-fold treating portion 500 by a pair of drawing rollers 905 that are close to the separating portion.

A sheet set sensor 910 that detects whether a sheet is set, or not, is disposed between the sheet feed roller 902 and the conveying roller 903. Also, a sheet feed sensor 907 that detects whether the sheet is conveyed by the pair of drawing rollers 905, or not, is disposed in the vicinity of the pair of drawing rollers 905.

Also, the inserter 900 can be disposed on not only the two-fold treating portion 500 but also the three-fold treating portion 400 so as to supply the sheet to the auxiliary conveying path 167 of the three-fold treating portion 400.

The inserter 900 is so designed as to be controlled by the inserter controlling portion 911 shown in FIG. 10.

(Finisher 600)

Referring to FIG. 10, the finisher 600 conducts a process of taking in the sheets conveyed from the image forming unit 300 through the two-fold treating portion 500, aligning a plurality of sheets taken in and binding those sheets into one sheet bundle, a staple side of the sheet bundle, a sorting process, a nonsorting process, and a sheet postprocess, such as a bookbinding process, etc.

As shown in FIG. 10, the finisher 600 includes a finisher path 504 provided with a pair of inlet rollers 502 taking in the sheet conveyed from the image forming unit 300 through the two-fold treating portion 500, and with a pair of conveying rollers 503.

The sheet guided to the finisher path 504 is conveyed toward a buffer roller 505 through the pair of conveying rollers 503. The pair of conveying rollers 503 and the buffer roller 505 each can rotate forward and reversely.

An inlet sensor 531 is disposed between the pair of inlet rollers 502 and the pair of conveying rollers 503.

A punch unit 508 which will be described later is disposed between the pair of conveying rollers 503 and the buffer roller 505, and the punch unit 508 is operated as occasions demand, so as to conduct a punching process in the vicinity of the trailing end of the sheet conveyed through the pair of conveying rollers 503.

The buffer roller 505 is a roller on which a given number of sheets conveyed through the pair of conveying rollers 503 can be wound. The sheets are wound on the buffer roller 505 by depressive runners 512, 513 and 514 during rotation of the roller 505. The sheets wound on the buffer roller 505 are conveyed in a direction along which the buffer roller 505 rotates.

A change-over flapper 510 is disposed between the depressive runner 513 and the depressive runner 514, and a change-over flapper 511 is disposed downstream of the depressive runner 514. The change-over flapper 510 separates the sheets wound on the buffer roller 505 from the buffer roller 505 and guides the sheets to a non-sorting path 521 or a sorting path 522.

The change-over flapper 511 separates the sheets wound on the buffer roller 505 from the buffer roller 505 and guides the sheets to the sorting path 522, and also guides the sheets wound on the buffer roller 505 to a buffer path 525 without separating the sheets.

The sheets guided to the non-sorting path 521 by the change-over flapper 510 are discharged onto the sample tray 701 through the pair of discharge rollers 509. Also, a sheet discharge sensor 533 for detection of jamming is disposed at some point along the nonsorting path 521.

On the other hand, the sheets guided to the sorting path 522 by the change-over flapper 510 are stacked on an intermediate tray 630 through a pair of conveying rollers 506 and a pair of conveying rollers 507. The sheet bundle stacked on the intermediate tray 630 into a bundle is subjected to an alignment process and a stapling process in accordance with the setting by the operating portion 303 (refer to FIG. 2), and thereafter discharged onto the stack tray 700 by discharge rollers 680*a* and 680*b*.

The above-described stapling process is conducted by the stapler 601. The sample tray 701 and the stack tray 700 are so structured as to be movable vertically.

When the sheet bundle is discharged onto the stack tray 700 from the intermediate tray 630, a processing tray 631 (refer to FIGS. 1 and 10) is projected to the outside of the copying machine 1000 so that the sheet bundle can be surely stacked onto the stack tray 700.

(Punch Unit 508 of Finisher 600)

The punch unit 508 is extending slenderly in a direction of from the front surface toward the back surface of the drawing planes of FIGS. 1 and 10.

Figure 11:
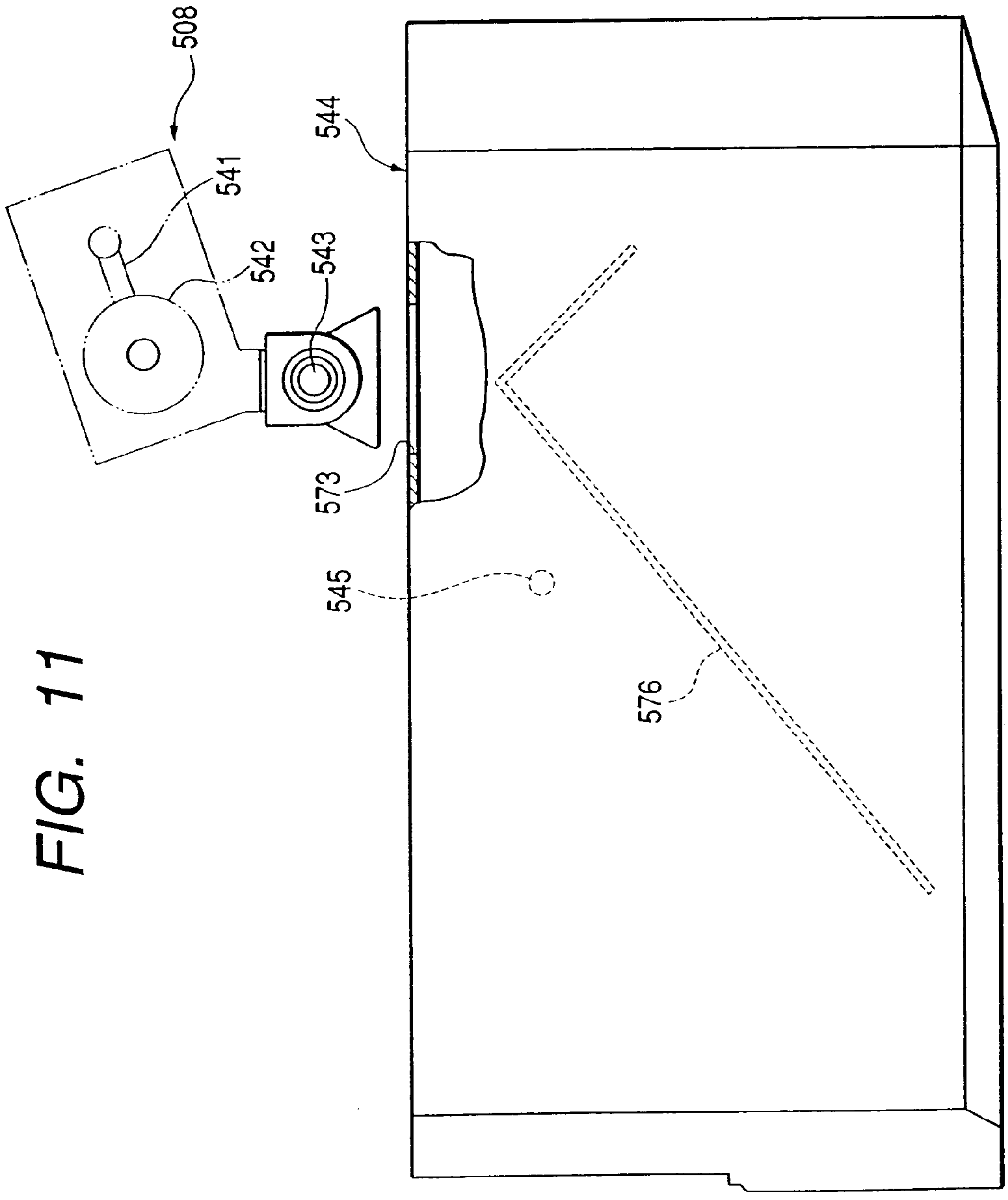
FIG. 11 is a front view showing a punch unit.
Figure 12:
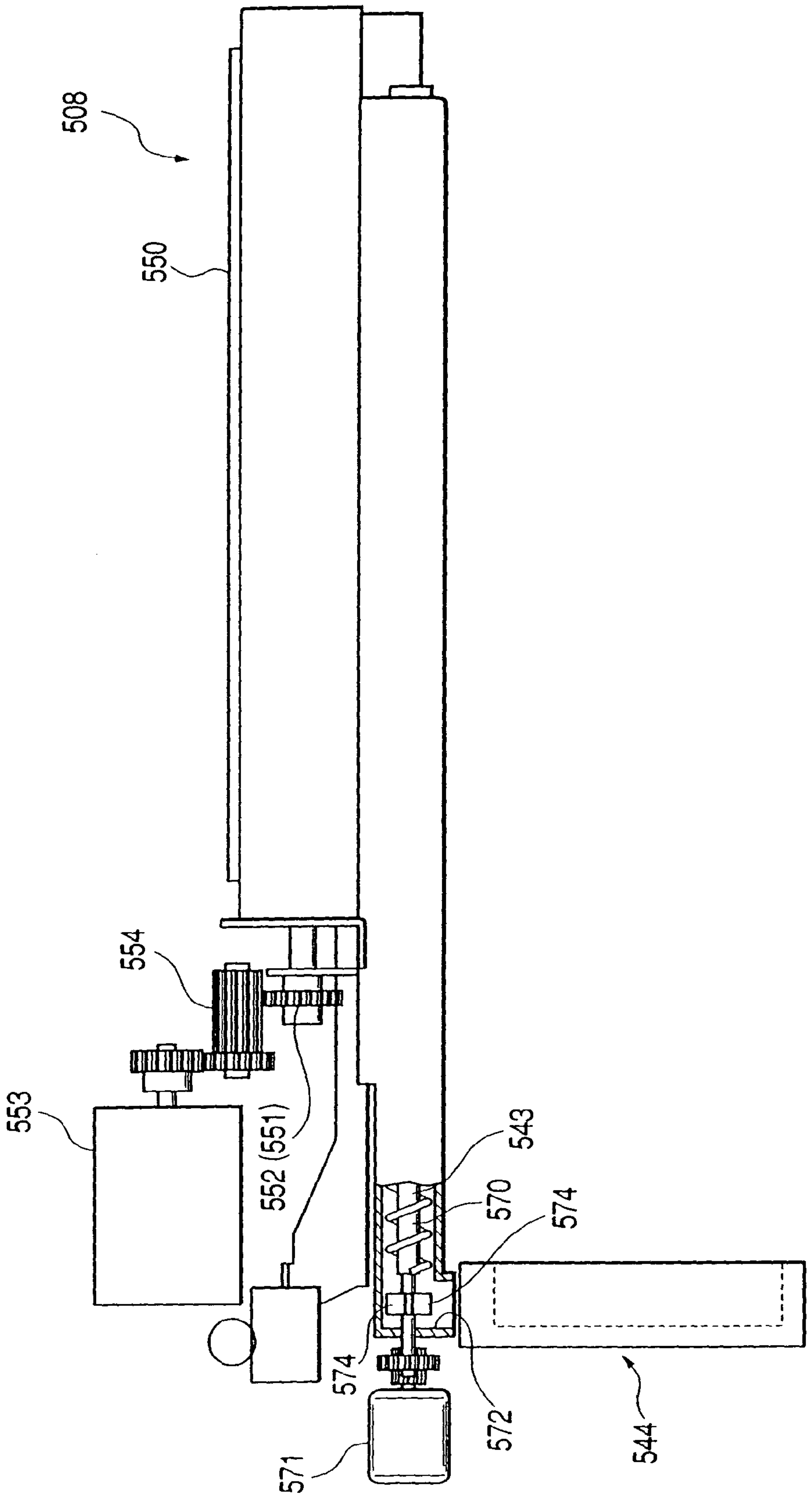
FIG. 12 is a view showing the punch unit of FIG. 11, viewed from the left side.
Figure 13:
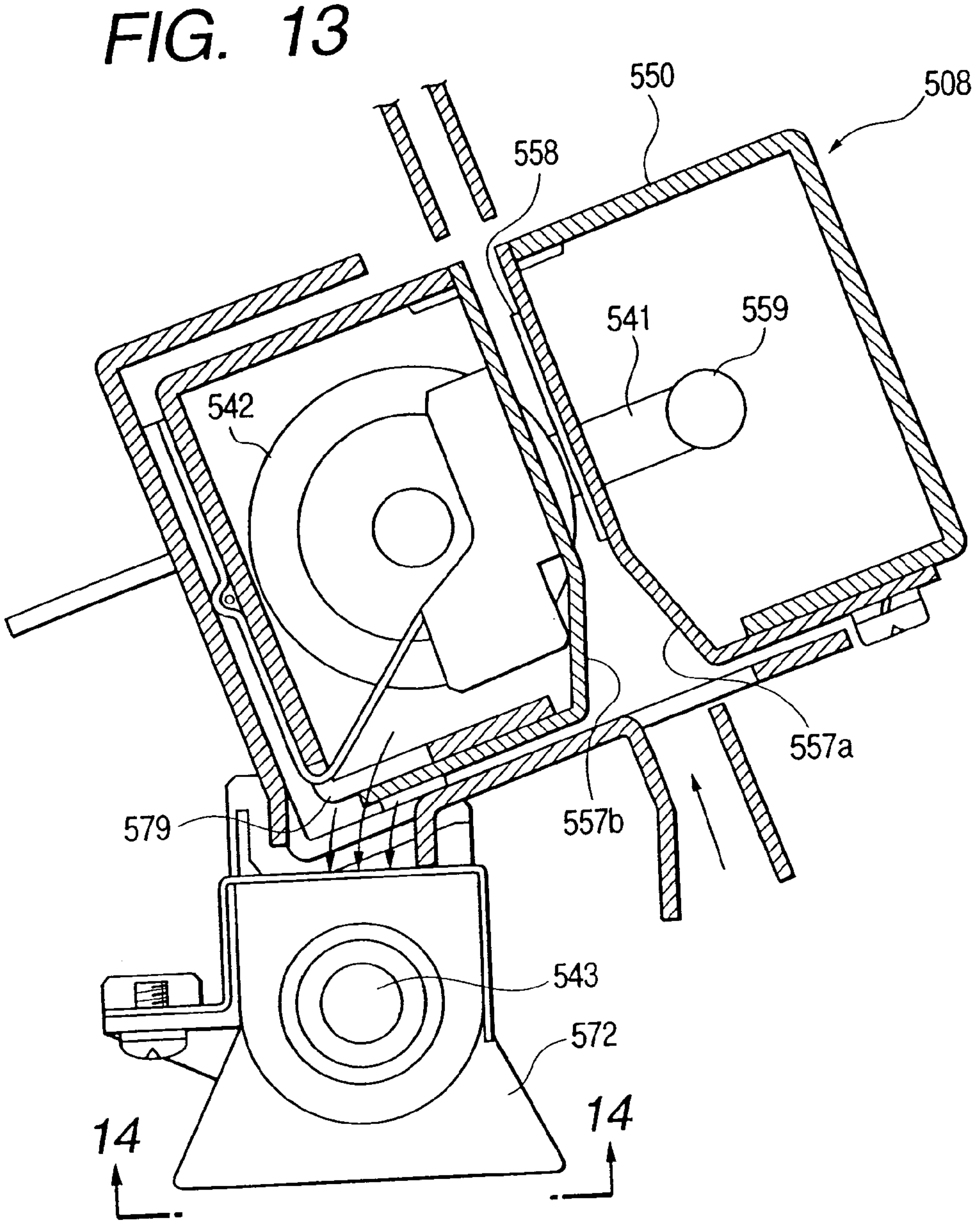
FIG. 13 is a partially broken view showing the punch unit in the vicinity of a punch debris discharge port.
Figure 14:
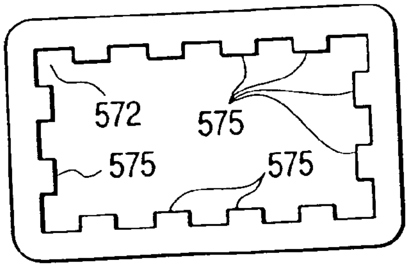
FIG. 14 is a view taken along the line 14—14 in FIG. 13.
Figure 15:
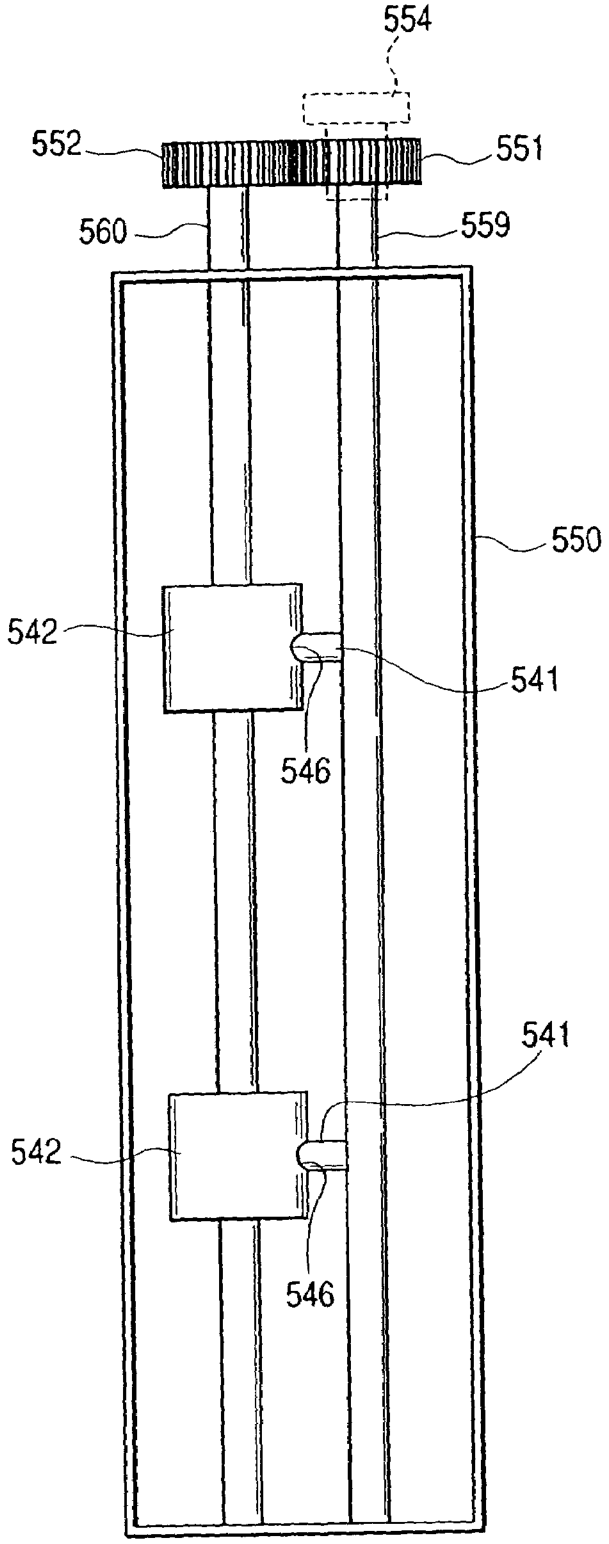
FIG. 15 is a plan view showing the outline of a punch and a die of the punch unit.
Figure 16:
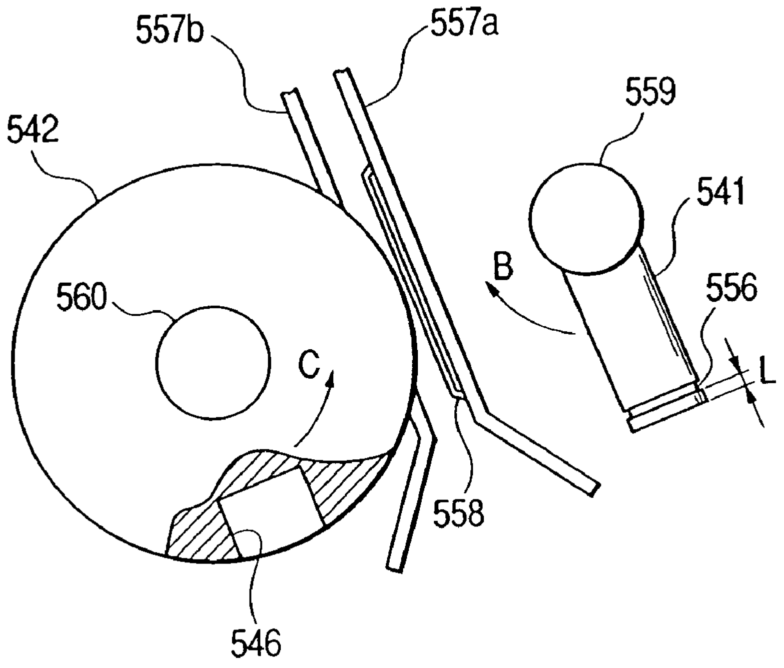
FIG. 16 is a diagram for explanation of the operation of the punch and the die in the punch unit before punching is conducted.
Figure 17:
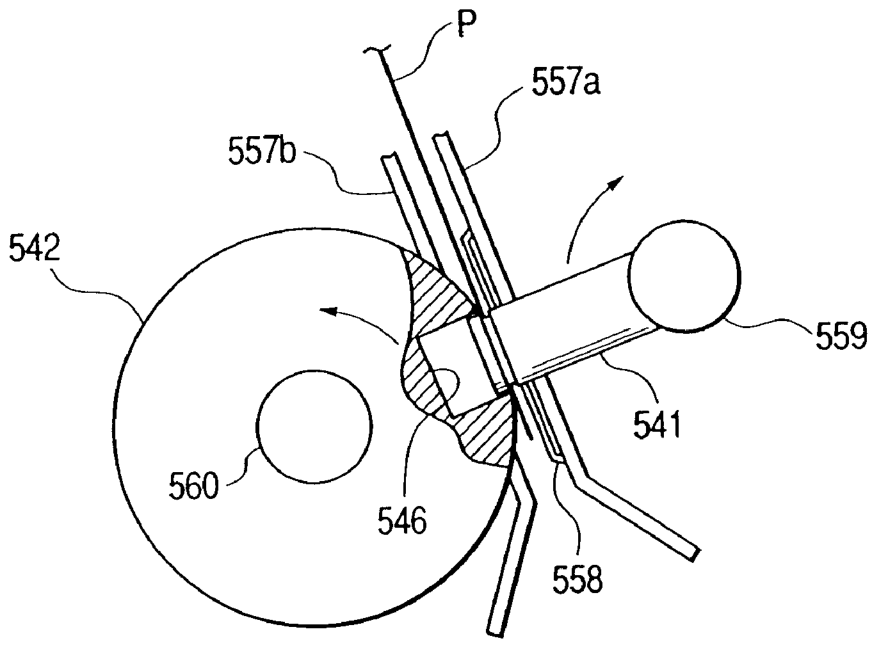
FIG. 17 is a diagram for explanation of the operation of the punch and the die in the punch unit while punching is being conducted.
Figure 18:
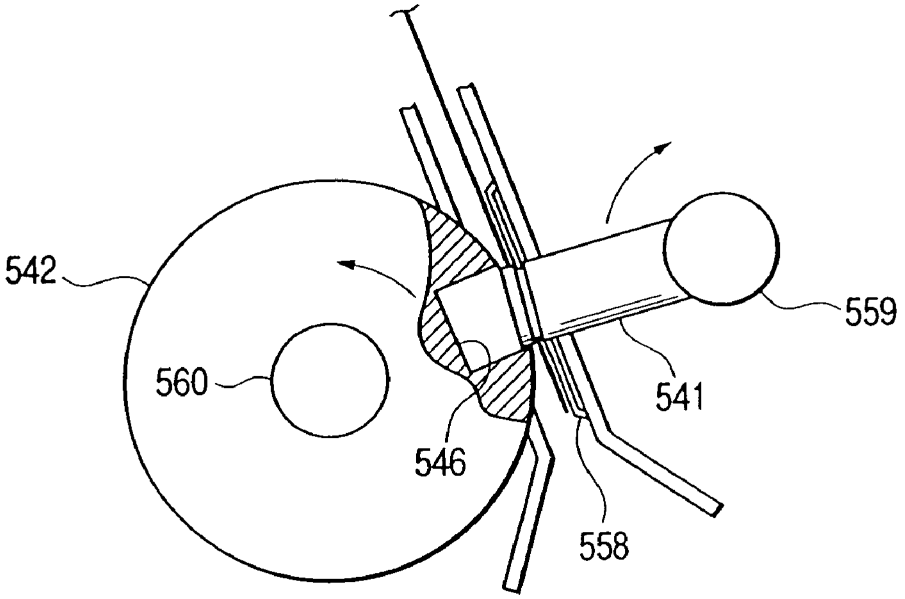
FIG. 18 is a diagram for explanation of the operation of the punch and the die in the punch unit when punching has been completed.

FIG. 11 is a front view showing the punch unit 508 when viewing the copying machine 1000 shown in FIGS. 1 and 10 from its front. FIG. 12 is a left side view showing the punch unit 508 when viewing the copying machine 1000 shown in FIGS. 1 and 10 from its left. FIG. 13 is a front partially cross-sectional view showing the punch unit 508 of FIG. 11. FIG. 14 is a view taken along the line 14—14 in FIG. 13. FIG. 15 is a plan view showing a punch and a die of the punch unit 508. FIGS. 16 to 18 are diagrams for explanation of the operation of the punch and the die.

The punch unit 508 is made up of a punch 541, a die 542, a punch debris discharge screw 543, a punch debris box 544 and so on.

The punch unit 508 cuts a hole in the sheet on the trailing end thereof conveyed by the pair of conveying rollers 503 by the punch 541 and the die 542 on the basis of a punching instruction given from the operating portion 303 (refer to FIG. 2) of the copying machine 1000, and then conveys the sheet to the buffer roller 505.

Also, the punch debris produced when cutting the hole in the sheet drops down on the screw 543 from a punch debris discharge portion 579 of a casing 550 as indicated by the arrows in FIG. 13, and is conveyed to the punch debris box 544 by the screw 543. When a given amount of punch debris is collected in the punch debris box 544, the given amount of punch debris is detected by a punch debris detecting sensor 545 disposed on the inner wall of the punch debris box 544 so that the punch debris can be discarded at once. The screw may be replaced by a circulating belt.

Referring to FIGS. 12, 13, and 15 to 18, the punch 541 and the die 542 are disposed on rotating shafts 559 and 560, and the rotating shafts 559 and 560 are pivotally supported by the casing 550, whereby the punch 541 and the die 542 are interlocked with each other by gears 551 and 550 meshed with each other, and the gear 551 receives the rotation force of the punch drive motor 553 through an idle gear 554 and rotates synchronously in directions indicated by arrows B and C. Usually, the punch 541 and the die 542 are held to a home position shown in FIG. 16.

Referring to FIG. 10, after a sheet trailing end detecting sensor 555 disposed between the pair of conveying rollers 502 and the punch unit 508 has detected the trailing end of the sheet, the punch drive motor 553 is driven at a given timing, as a result of which the punch 541 and the die 542 cut a hole in the sheet P on the trailing end thereof while rotating synchronously in the directions indicated by the arrows B and C as shown in FIGS. 16 to 18. The punched sheet is wound on the buffer roller 505.

Incidentally, a groove relieved portion 556 is defined in the outer periphery of the distal end of the punch 541. The relieved portion 556 is formed so as to avoid contact with corners of the hole 546 of the die 542 when the punch 541 enters the die 542 and is drawn out from the die 542.

However, when the punch 541 is pulled out from the die 542 after the punch 541 has cut a hole in the sheet P in cooperation with the die 542, there is a case in which the relieved portion 556 is caught on the edge of the hole that has just been cut, to thereby damage the sheet P.

Figure 19:
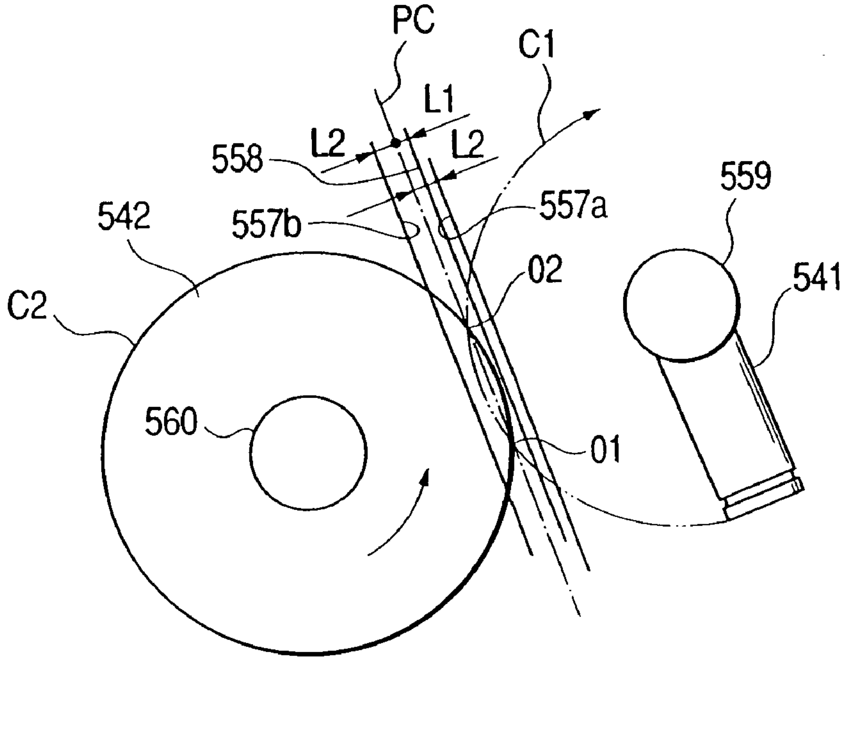
FIG. 19 is a diagram for explanation of a position at which a sheet position formation guide plate is fitted in the punch unit.

Under the above circumstances, in the punch unit 508 according to this embodiment, a sheet position regulating guide plate 558 is disposed on a pair of guide plates 557*a* and 557*b* which are opposed to each other and guide the sheet between the punch 541 and the die 542. In a schematic diagram of FIG. 19, the pair of guide plates 557*a* and 557*b* are disposed on positions with the same distance (L2) from a path center PC that passes through two cross points O1 and O2 of a rotation locus circle C1 that centers the distal end of the punch 541 and a rotation locus circle C2 of the die 542 (in the rotation locus circle C2 of the die 542, the outer shape per se of the die circular in cross-section is a rotation locus). The sheet position regulating guide plate 558 is disposed between the guide plate 557*a* on the punch 541 side and the outer periphery of the die 542.

Accordingly, a distance (L1) between the path center PC and the sheet position regulating guide plate 558 is so set as to be shorter than the above distance (L2), and the sheet position regulating guide plate 558 is apart from the rotation locus circle C2.

As a result, because the sheet is guided by the sheet position regulating guide plate 558 so as to be closer to the die side than that in the conventional device, the punch that has cut a hole in the sheet can be drawn out of the hole in the sheet instantly and rapidly as compared with the conventional device without being engaged with the sheet hole for a long period of time. Therefore, the punch 541 does not damage the sheet since the relieved portion 556 of the punch 541 cannot be caught on the edge of the hole which has just been cut.

The sheet position regulating guide plate 558 may be omitted, and the guide plate 557*a* may be disposed at the position of the sheet position regulating guide plate 558.

Also, the relieved portion 556 does not always need to be formed depending on the thickness and the length of the punch 541, the diameter of the die 542 and the diameter of the hole 546. In this case also, the punch does not damage the sheet since the distal end of the punch cannot be caught on the hole of the sheet.

Figure 21:
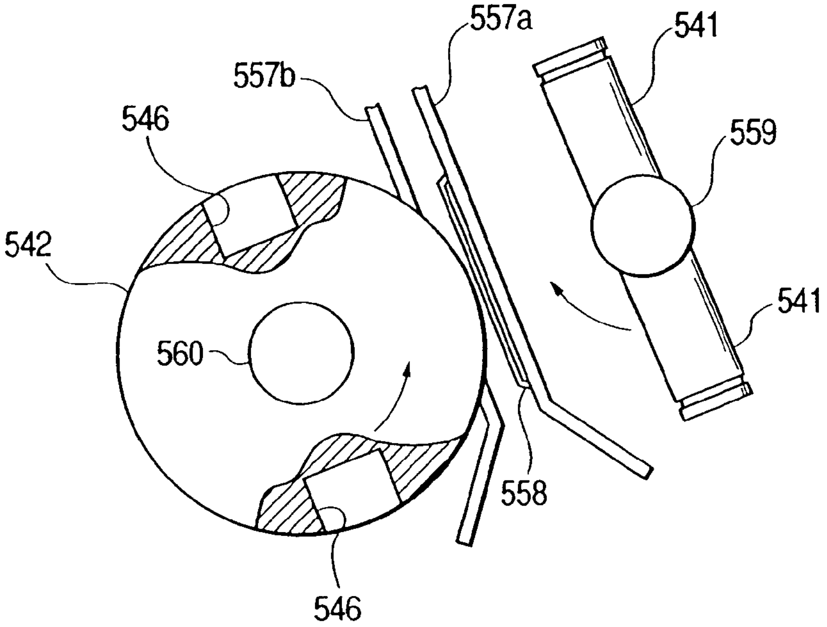
FIG. 21 is a diagram showing a punch unit in accordance with another embodiment of the present invention.

Further, as shown in FIG. 21, two punches 541 may be projected from the rotating shaft 559 at an angle of 180° in the rotation direction with respect to each other, and two die holes 546 may be formed in the die 542 at an angle of about 180° in the rotation direction with respect to each other. Alternatively, although not shown, three punches 541 may be projected from the shaft at an angle of 120° with one another, and three die holes 546 may be formed.

In other words, the punch and the die hole may be disposed at positions where a succeeding punch and a succeeding die hole are not engaged with each other before the punch that has punched the sheet and the corresponding die hole are completely separated from each other.

If a plurality of punches 541 and a plurality of die holes 546 are disposed in the rotation direction as described above, it is unnecessary to rotate the punch or the die by one rotation every time the sheet is punched, and the sheet can be punched at a high speed for that. Also, if a plurality of punches and a plurality of die holes are disposed, the abrasion of the punches and the die holes is reduced as much, so that the punches and the die can be used for a long period of time.

Also, in the above-described punch unit 508, in order to be adaptive to Japanese standard, two pairs of punches 541 and dies 542 are disposed in the axial direction of the rotating shafts 559 and 560 so as to cut two holes in the sheet at a time. On the other hand, in order to be adaptive to U.S. standard, three pairs of punches 541 and dies 542 are disposed so as to cut three holes in the sheet at a time. In addition, in order to be adaptive to European standard, four pairs of punches 541 and dies 542 are disposed so as to cut four holes in the sheet at a time. Thus, in the present invention, the number of holes which can be cut in the sheet at a time is not limited.

Figure 22:
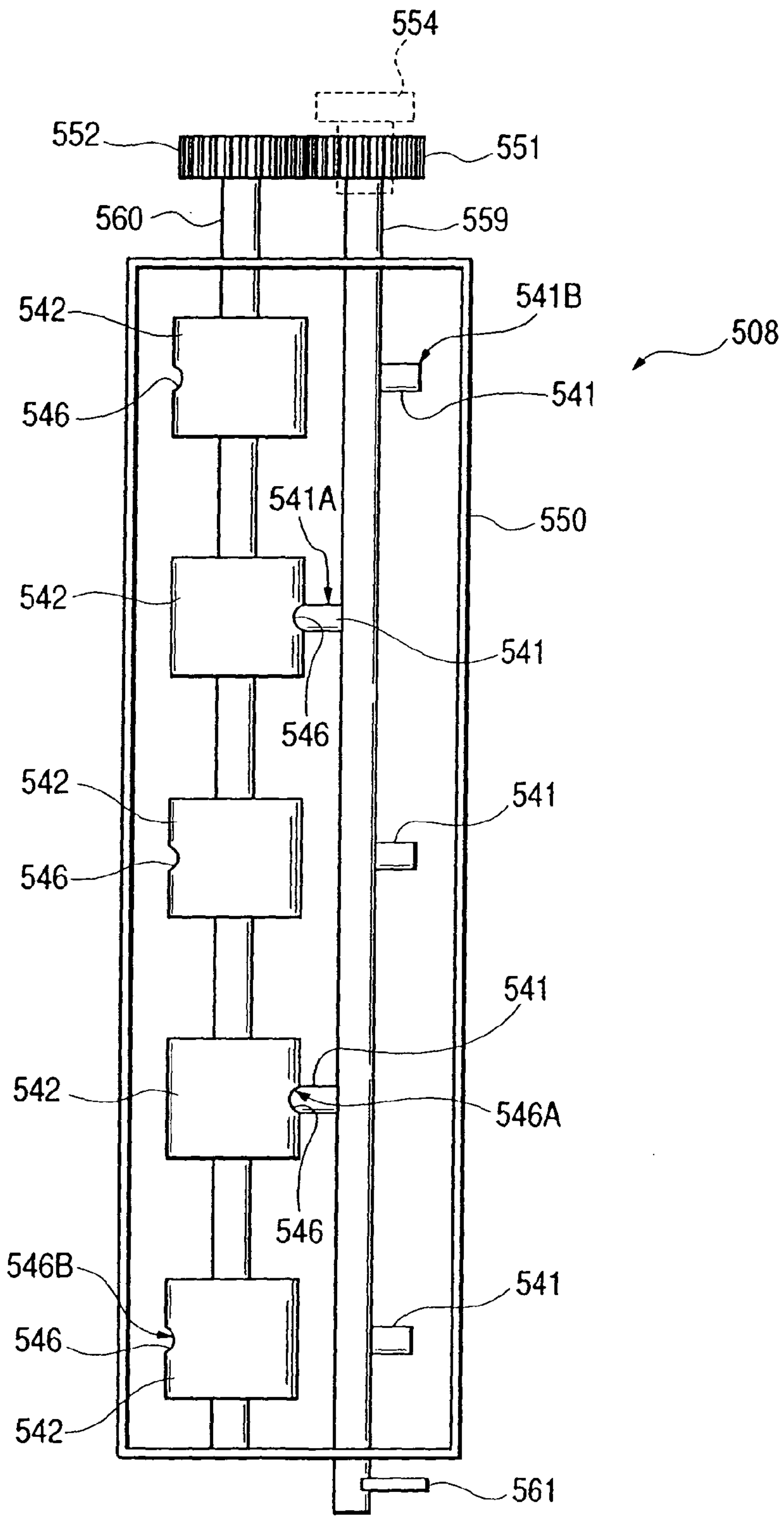
FIG. 22 is a plan view showing the outline of a punch and a die in a punch unit in accordance with still another embodiment of the present invention.

In addition, as shown in FIG. 22, five punches 541 and five dies 542 are disposed on the rotating shafts 559 and 560, respectively, so as to be apart from each other, and the adjacent punches 541 are disposed such that they face opposite directions. Employing the above-described structure makes it possible, with one punch unit 508, to adapt to a case in which two holes are cut in the sheet and to a case in which three holes are cut in the sheet, thereby widening the application range.

Figure 23:
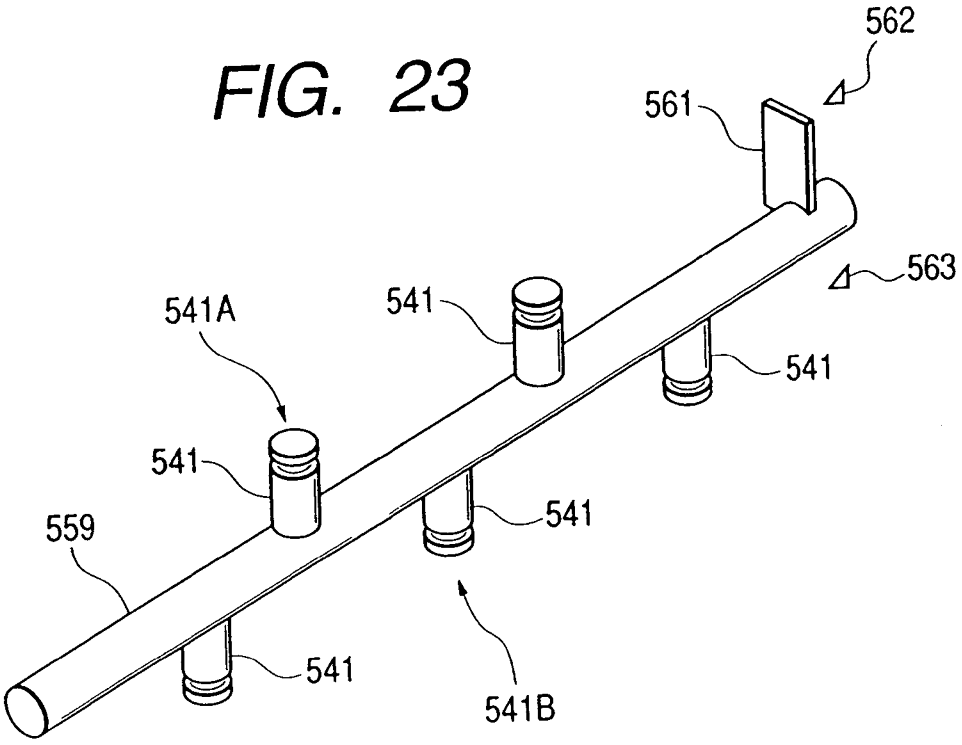
FIG. 23 is a perspective view showing the punch of FIG. 22.

In this case, the initial positions of the punch having a two-hole punch train 541A and a three-hole punch train 541B and the die having a two-hole hole train 546A and a three-hole hole train 546B are set by detecting a flag 561 disposed on the rotating shaft 559 with either a two-hole sensor 562 or a three-hole sensor 563 as shown in FIG. 23.

Also, the punch and the die are rotated through 360° to cut two or three holes in the sheet. Because the hole is cut in the trailing end of the sheet, when the rotating shafts 559 and 560 rotate and the punches and the dies for three holes are engaged with each other after the punches and dies for two holes have cut holes in the sheet, the sheet in which two holes have been cut has completely passed between the punches and the dies. Thus, there is no case in which the punches and dies for three holes cut three holes in the sheet. Likewise, when three holes are to be cut in the sheet, there is no case in which two holes are cut in the sheet.

In addition, in this embodiment, the dies 542 are disposed on the rotating shaft 560 for each hole 546 so as to be separated from each other, but one columnar die in which a plurality of die holes are defined may be provided instead.

(Punch Units in Other Embodiments)

Figure 36:
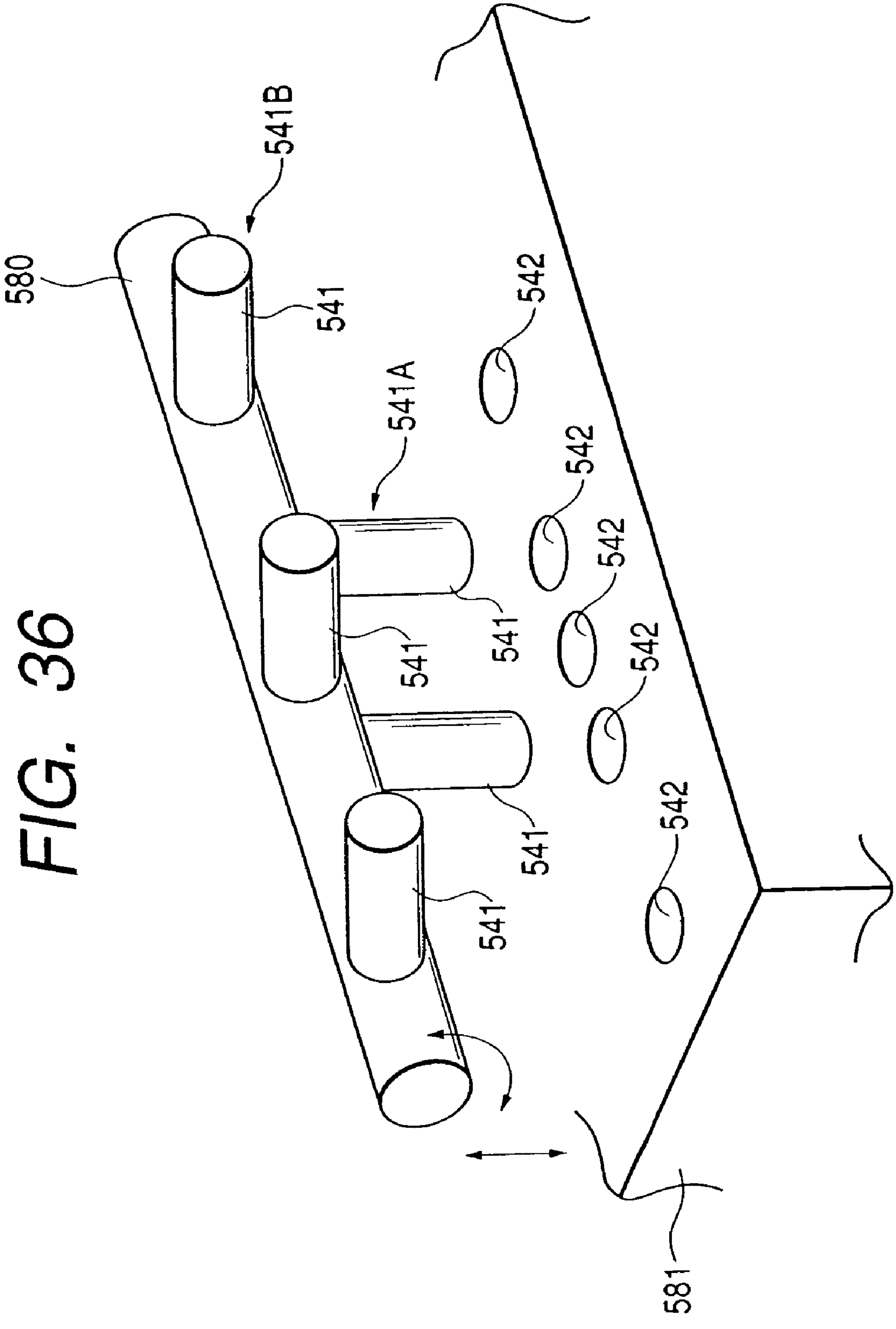
FIG. 36 is a perspective view showing the outline of a punch unit in accordance with another embodiment of the present invention.

In the above-described punch unit, the punch 541 and the die 542 are so designed as to rotate only in one direction. However, as shown in FIG. 36, there is a unit in which a plurality of punch trains 541A and 541B different in the number of punches 541 from each other are disposed in the rotation direction on a rotating shaft 580 that reciprocatingly rotates and goes up and down, the rotating shaft 580 is reciprocatingly rotated, the different punch and the holes 542 of the die 581 are opposed to each other, and the entire rotating shaft 580 is allowed to go down, to thereby cut a hole in the sheet. This case also has an advantage that the hole can be cut in the sheet effectively as in the above-described punch unit.

(Disposal of Punch Debris)

The punch debris produced when punching the sheet by the punch 541 and the die 542 drops into a lower portion of the casing 550 shown in FIG. 12, and received in the lower portion of the casing 550. Then, the punch debris is collected on the left side of FIG. 12 by a screw 570 that is rotated by a screw drive motor 571, and discharged from a punch debris discharge port 572 of the casing 550. Thereafter, the punch debris is collected in a punch debris box 544 to be described later, which is disposed below the punch debris discharge port 572 and which is detachably attached onto a rear portion of the main body of the copying machine. The rotating shafts 559 and 560 of the punch 541 and the die 542 and the screw shaft 570 are disposed in parallel with each other.

When the punch debris box 544 is detached from the copying machine in order to discard the punch debris collected within the punch debris box 544, the punch debris remaining within the casing is received by the screw shaft 570 and hardly drops down from the punch debris discharge port 572.

There is a case in which the punch debris is electrostatically charged and massed in the punch debris discharge port 572 to clog the punch debris discharge port 572. For that reason, as shown in FIG. 12, four vanes 574 that forcibly discharges and drops down the punch debris are radially disposed on an end portion of the screw shaft 570 positioned at the punch debris discharge port 572. In addition, as shown in FIG. 14, a plurality of projected ribs 575 that extend alternately in upper and lower directions are so formed as to make it difficult to mass and attract the punch debris within the punch debris discharge port 572. The ribs slant the punch debris to help the punch debris to drop.

As described above, with the provision of the vanes 574 and the projected ribs 575, it is difficult to mass and attract the punch debris on the punch debris discharge port 572 and in the periphery thereof, eliminating an obstructive factor to the discharge of the punch debris. The projected ribs 575 may be replaced by a plurality of projections.

Figure 32:
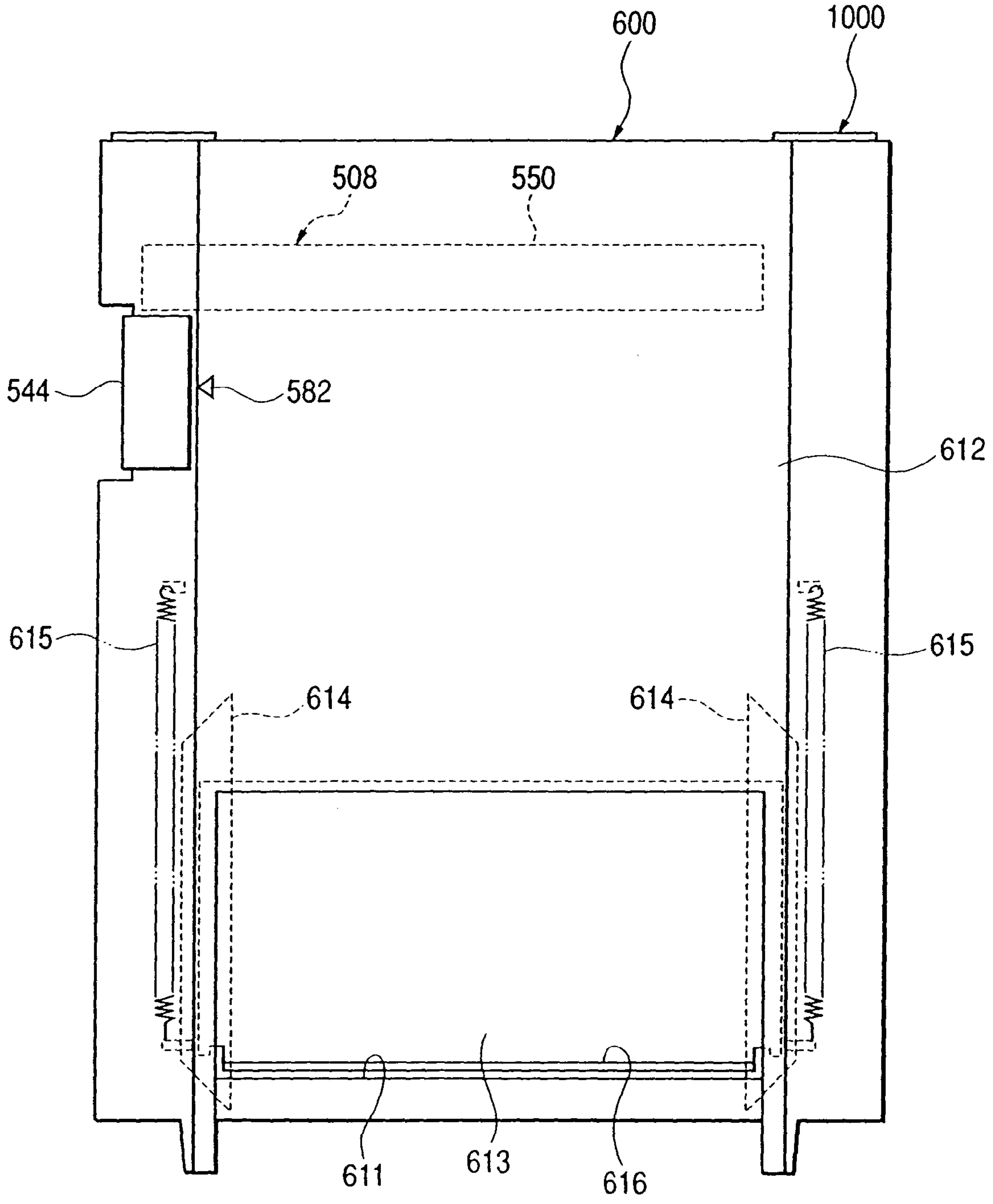
FIG. 32 is a view showing the outline of the finisher in the vicinity of the sheet discharge port.

As shown in FIG. 32, the punch debris box 544 is detachably attached to a rear surface of the finisher 600 by a not shown magnet.

Also, an inclined and reverse V-shaped dispersing plate 576 which disperses the punch debris that drops from a punch debris receive port 573 (refer to FIG. 11) is disposed within the punch debris box 544. The punch debris that has dropped from the punch debris receive port 573 is dispersed rightward and leftward by the dispersing plate 576 and collected within the punch debris box 544 in FIG. 11.

If the dispersing plate 576 is not provided, the punch debris heaps up just under the punch debris receive port 573, and the punch debris detecting sensor 545 is actuated before the punch debris box 544 is filled with the punch debris, resulting in a fear that a false report is made that the punch debris box 544 is full.

However, with the provision of the dispersing plate 576, because the punch debris is dispersed and uniformly collected within the punch debris box 544, a space within the punch debris box 544 is fully utilized to receive the punch debris therein.

Figure 24:
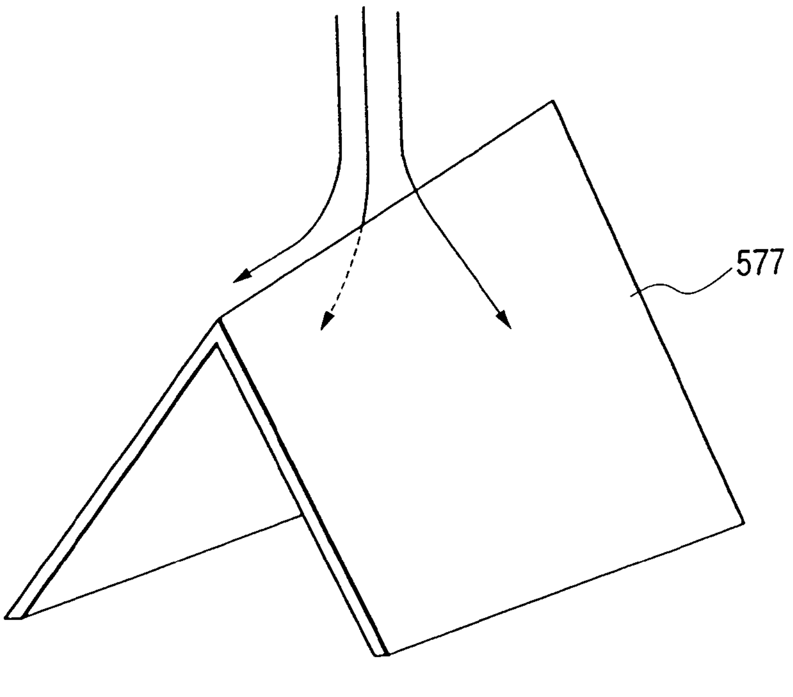
FIG. 24 is a perspective view showing a dispersing plate in the punch unit.

The dispersing plate 576 shown in FIG. 11 can disperse the punch debris only in two directions, that is, rightward and leftward in FIG. 11. However, if a dispersing plate 577 is inclined in three directions as shown in FIG. 24, the punch debris can be more surely dispersed by guiding the punch debris in the three directions indicated by arrows.

Also, when the punch debris detecting sensor 545 detects that the punch debris box 544 is filled with the punch debris, and the user detaches the punch debris box 544 from the rear surface of the finisher 600 for the purpose of discarding the punch debris, the punch unit controlling portion 578 actuates a sample tray vertically moving motor 714 and a stack tray vertically moving motor 702 (refer to FIG. 26) in response to the operation of the punch debris detecting sensor 545 to move the sample tray 701 to the highest position and the stack tray 700 to the lowest position, to thereby improve the visibility and operability of the punch debris box 544.

Also, when the punch debris box 544 is detached, the punch debris box detecting sensor 582 disposed in the copying machine (refer to FIG. 32) is actuated, and in order to prevent the punch debris from being scattered, the punch unit controlling portion 578 stops the drive motor 571 of the screw 543 and limits the duration of the operation of the punch unit 508 to a time required to punch a given number of sheets (for example, 100 sheets). This number is determined on the basis of the amount of the punch debris accumulated in the casing 550 and the groove of the screw shaft 570, and the operation of the punch unit 508 is stopped afterward. In this case, other mechanisms continue their operation, and the copying machine 1000 can be continuously used without stopping all the operation of the copying machine 1000 including the punching operation unlike the conventional device. Thus, the efficiency of the copying operation of the copying machine 1000 can be enhanced without stopping the copying operation of the copying machine 1000.

Figure 20:
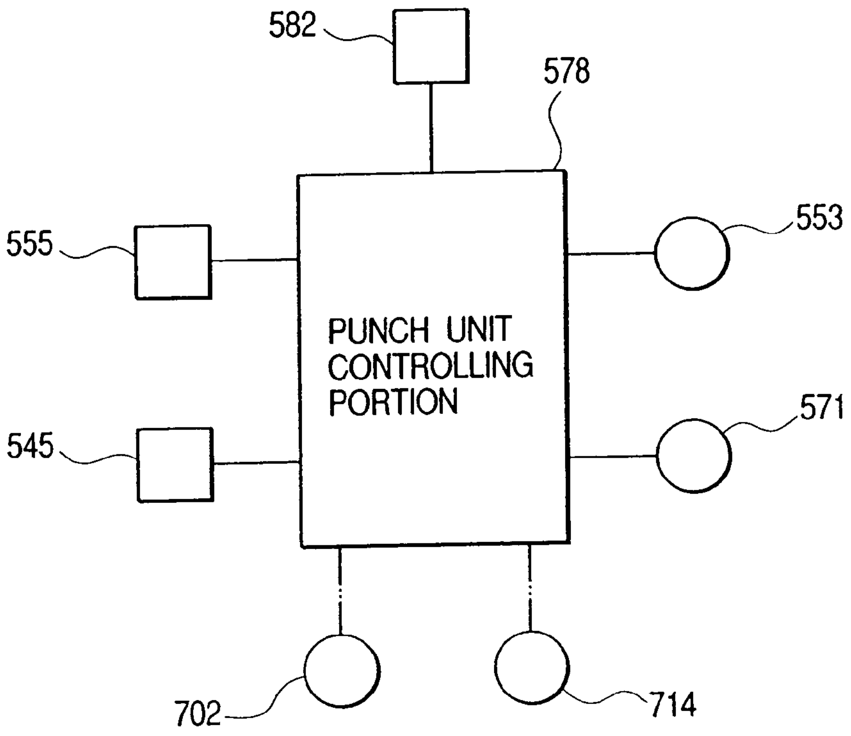
FIG. 20 is a block diagram illustrating the control of the punch unit.

As described above, the punch unit 508 is operated by the punch unit controlling portion shown in FIG. 20.

(Finisher 600 and Stapler Unit 800)

Figure 25:
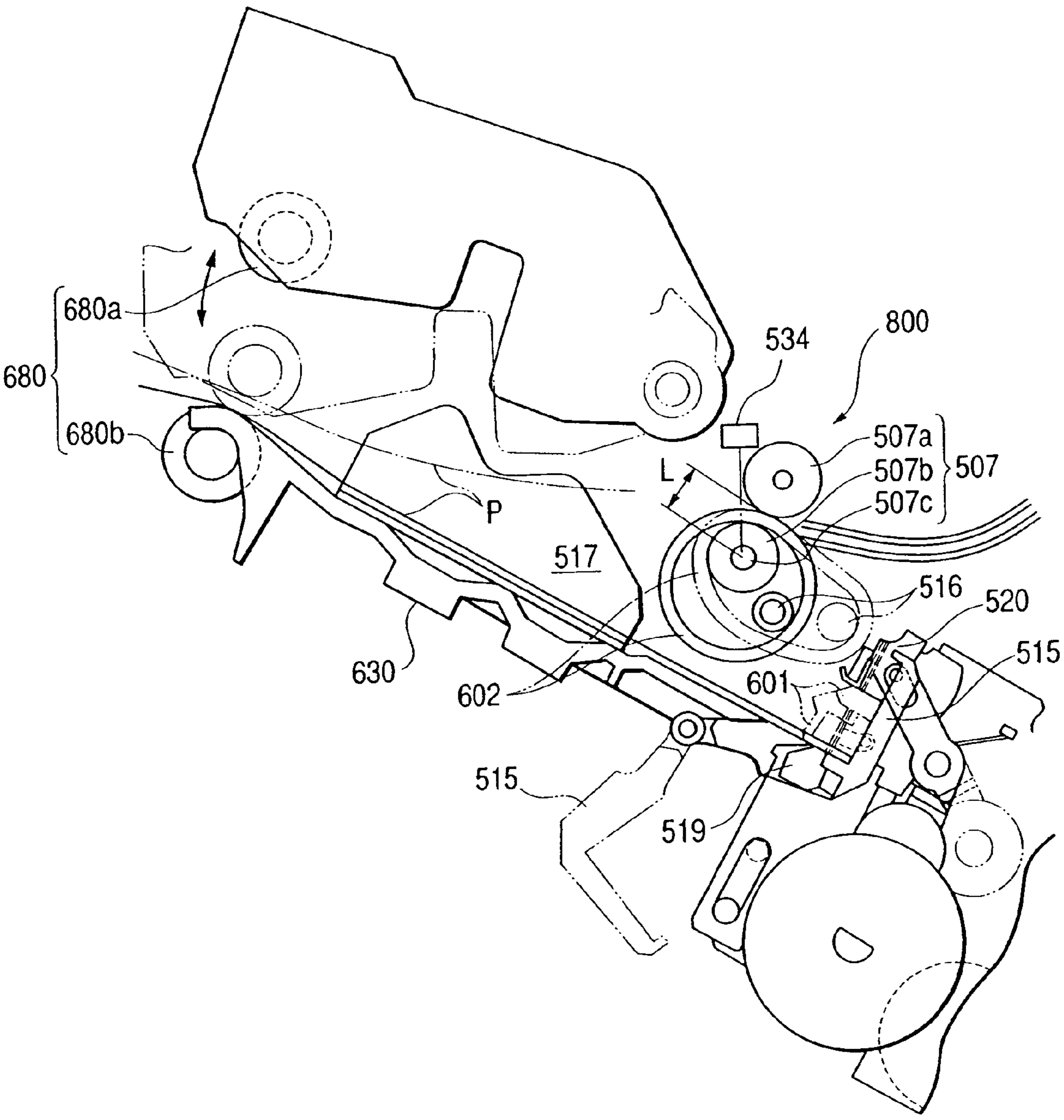
FIG. 25 is a front view showing the outline of a stapler unit.

Referring to FIG. 25, a stapler unit 800 is a unit that aligns and binds the sheets.

The sheets punched by the punch unit 508, or the sheets that have passed through the punch unit 508 without being subjected to a punching process are sequentially overlapped on the buffer roller 505 so that three sheets are sequentially wound on the buffer roller 505. The reason why three sheets are wound on the buffer roller 505 is that, when the stapler 601 which will be described later binds the sheet bundle stacked on the intermediate tray 630, the sheet is not conveyed onto the intermediate tray 630 and the sheets sequentially conveyed during that period are shunted to the buffer roller 505.

The sheet is guided along the sorting path 522 and conveyed onto the intermediate tray 630 by the pair of conveying rollers 507.

A knurled belt 602 made of rubber or resin and elastically deformable and larger in diameter than that of a lower conveying roller 507*b* is nipped between an upper conveying roller 507*a* and the lower conveying roller 507*b* of the pair of conveying rollers 507. The sheet is nipped between the knurled belt 602 and the upper conveying roller 507*a* and discharged onto the intermediate tray 630.

A distance L between a plane of the upper conveying roller 507*a* with which the knurled belt 602 is in contact and a rotating center 507*c* of the lower conveying roller 507*b* is calculated from the conveying speed of the sheet when the sheet is conveyed from the pair of conveying rollers 507, and set to be slightly longer (for example, about 10% on the basis of the experimental results) than the calculated value. As a result, the sheet P is so conveyed as to fly onto the intermediate tray 630 at a desired conveying speed as indicated by an alternate long and two short dashes line and is landed on a given position of the intermediate tray 630.

The radius of the knurled belt 602 may be set to a designed value, and the rotating speed of the roller drive motor 534 that rotates the lower conveying roller 507*b* (or the rotating transmission ratio of a rotation force transmission gear train not shown disposed between the roller drive motor 534 and the lower conveying roller 507*b*) may be set so that the peripheral speed of the lower conveying roller 507*b* becomes higher than the above calculated value, to thereby rotate the lower conveying roller 507*b*.

The rear end of the intermediate tray 630 (the right side of FIG. 25, a side close to the two-fold treating portion 500) is set to be lower than the front end thereof. For that reason, the sheet P discharged to the intermediate tray 630 is retreated to the rear end side as indicated by a solid line and received by a sheet receive piece 515. When a given number of sheets P are stacked on the intermediate tray 630, the rear ends of the sheets are aligned into a sheet bundle, and the lower portion of the knurled belt 602 obstructs the retreating sheet. For that reason, the knurled belt 602 is drawn upstream of the sheet conveying direction by a displacable roller 516 a position of which is displaced so as to be flatly deformed as indicated by an alternate long and two short dashes line.

While the given number of sheets are stacked on the intermediate tray 630, a pair of aligning plates 517 (one of the aligning plates is not shown) which align the width of the sheets are repeatedly made close to or far from the sheets from both sides of the sheet in the widthwise direction, to thereby align the width of the sheets.

When a given number of sheets are stacked on the intermediate tray 630, the sheet receive piece 515 goes down as indicated by an alternate long and two short dashes line, and the stapler head 601 approaches the anvil 519, and the sheet bundle is nipped between the stapler head 601 and the anvil 519 and bound by the staple 520.

The sheet bundle bound by the staple 520 is released from drawing of the displacable roller 516 and discharged onto the stack tray 700 or the sample tray 701 by the rotation of the knurled belt 602 returned to an original circle and the pair of discharge rollers 680 (680*a* and 680*b*) which approach the intermediate tray 630 and go down.

When the sheet bundle is discharged from the intermediate tray 630, the discharge roller 680*a* goes up and tilts at a position indicated by a solid line in a direction apart from the intermediate tray 630, and the sheet receive piece 515 also goes up and tilts at a position indicated by a solid line, thereby coming to a standby state in which a sheet which will be subsequently discharged is received by the sheet receive piece 515.

(Sample Tray 701 and Stack Tray 700 of Finisher 600)

Figure 26:
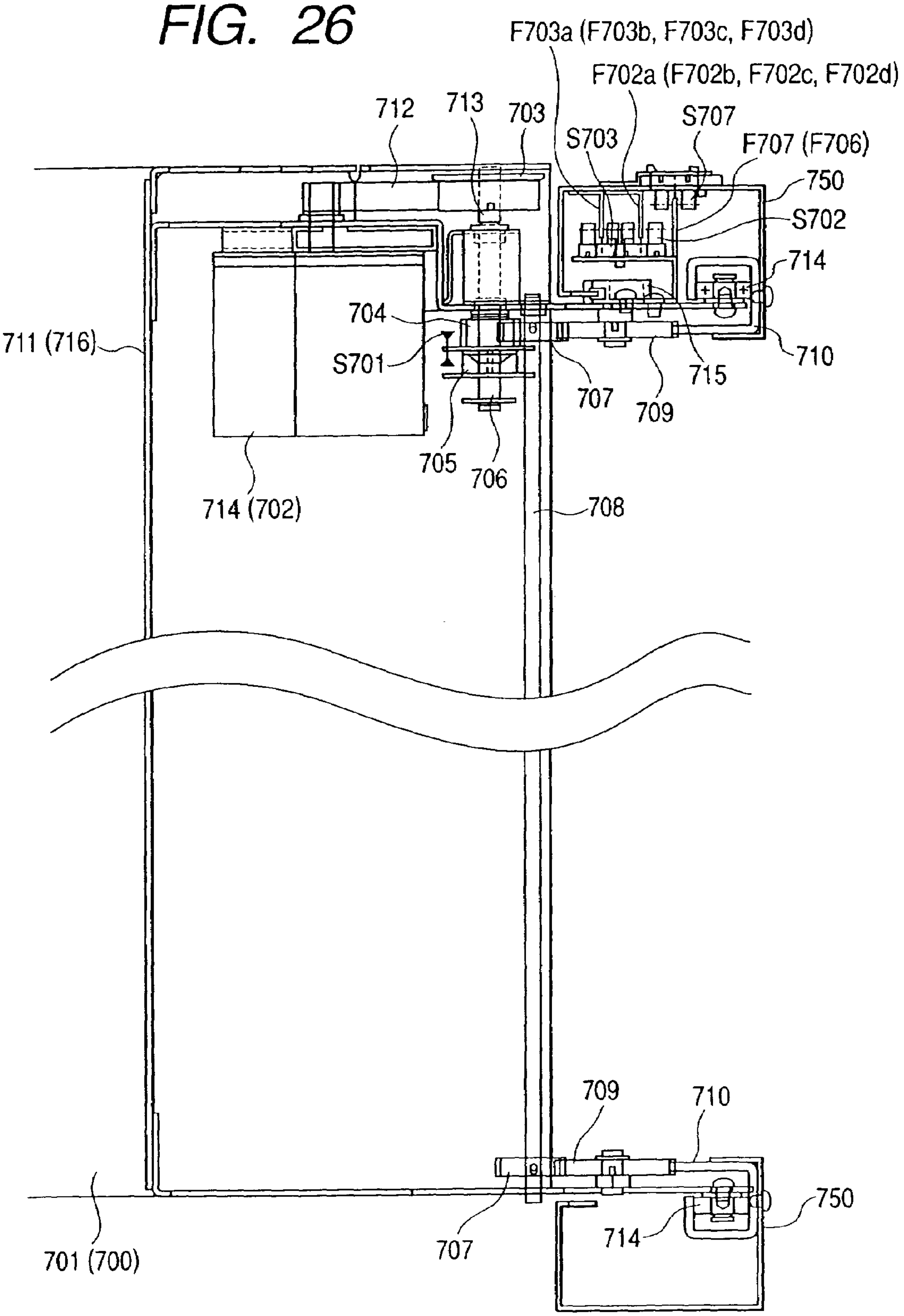
FIG. 26 is a plan view showing the outline of a finisher.
Figure 27:
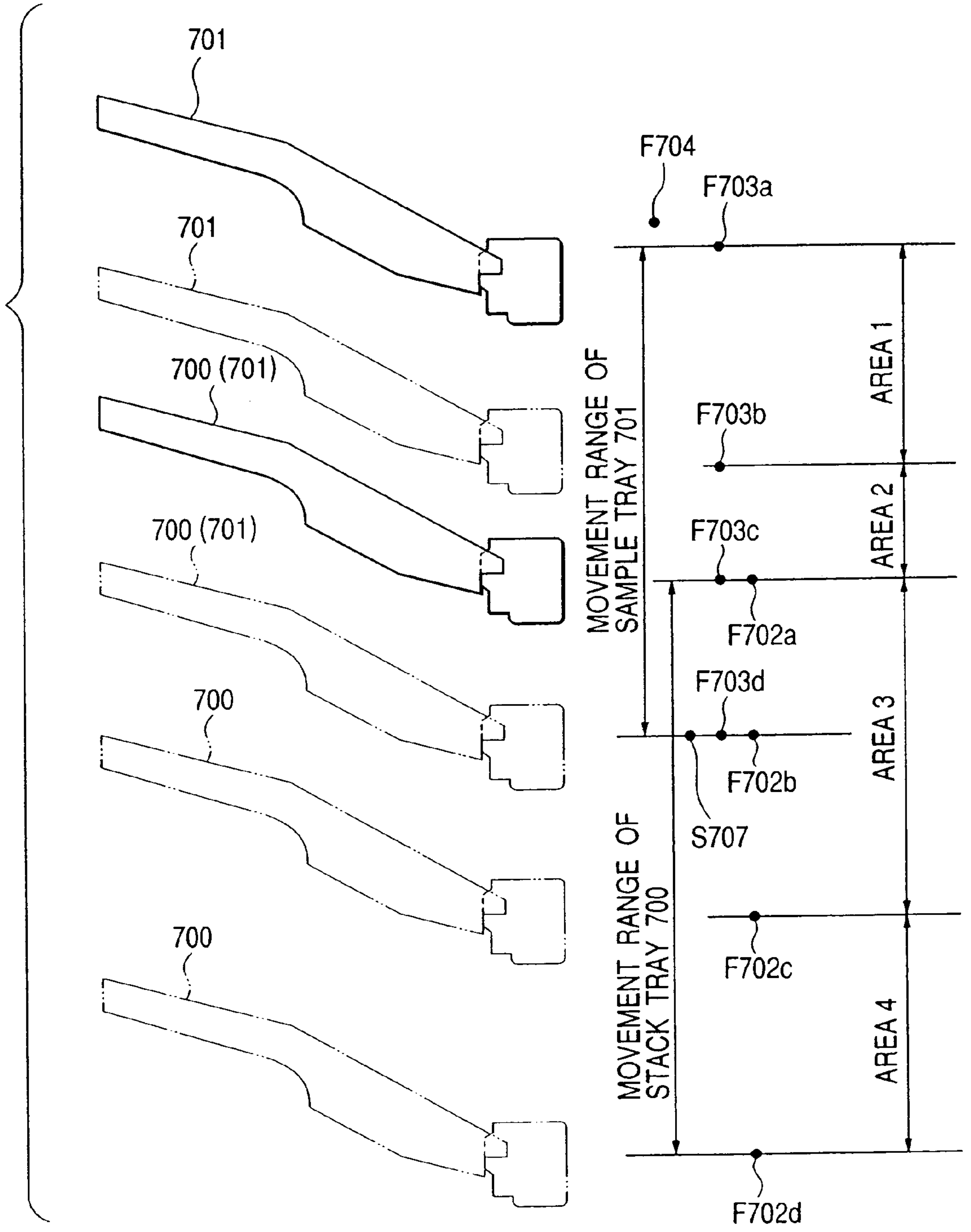
FIG. 27 is a diagram for explanation of the ascent/descent operation of a sample tray and of a stack tray.

Referring to FIGS. 10, 26 and 27, two trays 701 and 700 are selectively used depending on the circumstances. The stack tray 700 located on a lower position is selected when receiving a copy output, an output of the image forming unit portion, etc., and the sample tray 701 located on an upper position is selected when receiving a sample output of copies, an interrupt output, an output when the stack tray is in a state of over-flow, a function sharing output, an output when a job is mixedly mounted, etc.

These two trays 701 and 700 have a sample tray vertically moving motor 714 and a stack tray vertically moving motor 702 (refer to FIG. 26), respectively, so that these trays 701 and 700 can move vertically independently, and these trays 701 and 700 are then fitted onto a rack 710 which is fitted onto a frame 750 of the finisher 600 in a vertical direction and also serves as a roller receiver. Also, a regulating member 715 regulates the play of the trays 700 and 701 in the depthwise direction.

Also, the stack tray 700 and the sample tray 701 are movable vertically along a position regulating member 600*a*

(refer to FIG. 10) which is a wall plate of the finisher 600 on the tray side and disposed vertically.

In the moving mechanism of the tray, the sample tray vertically moving motor 714 is fitted on a frame 711 of the sample tray 701, and a pulley press-fitted onto the motor shaft transmits a drive force to a pulley 703 through a timing belt 712. A shaft 713 connected to the pulley 703 by a parallel pin transmits a drive force to a ratchet 705 connected to the shaft 713 by a parallel pin similarly, and the ratchet 705 is urged against an idler gear 704 by a spring 706.

The ratchet 705 transmits a drive force to an idler gear 704, and the idler gear 704 is meshed with one of gears 707 and fitted with the other of gears 707 through a shaft 708 so that the drive force is transmitted to the rack 710 on both the front and back sides of the tray. The gears 707 are so designed as to be movable along the rack 710 through a gear 709. The two rollers 714 on one side of the support portion of the tray are received in the roller receiver that also serves as the rack 710.

Also, when the tray goes down, in order not to damage the tray drive system by an interposed foreign material, the ratchet 705 pushes away the sprig 706 of the ratchet 705 only in a direction along which the tray is raised and conducts idling. When the ratchet 705 is idled, an idle detecting sensor S701 for immediately stopping the drive of the tray detects a slit formed in the idler gear 704. The idle detecting sensor S701 is used also as step-out detection at a normal time.

The stack tray 700 also includes a frame 716 which has the same moving mechanism as that of the sample tray 701.

An area detecting sensor S703 is disposed on the sample tray 701, and so designed as to detect an area of from an area flag F703*a* to an area flag F703*d*. The area flag F703*a* is fixed to the frame 750 of the finisher in the vicinity of the upper surface of the sample tray 701 on the uppermost position which is slightly below an upper limit sensor S704 that stops the excessive going-up of the sample tray 701.

The area detecting sensor S702 is disposed on the stack tray 700 and so designed as to detect an area from an area flag F702*a* to an area flag F702*d*. The flags F702*a* and F702*d* are fixed to the frame 750 of the finisher.

A point sensor S707 is fixed onto the frame 750 of the finisher and designed so as to be actuated by an area flag F707 disposed on the sample tray 701 when about 1000 sheets discharged from the intermediate tray 630 as a bundle are stacked on the sample tray 701 regardless of the size of the sheets.

Also, the point sensor S707 is also designed so as to be actuated by an area flag F706 disposed on the stack tray 700 when about 1000 sheets discharged from the intermediate tray 630 as a bundle are large-sized and stacked on the stack tray 700.

An area flag F703*b* is disposed on a position when about 1000 sheets are stacked on the sample tray 701 from an area flag F703*a* for detection of a non-sorting sheet surface, and designed so as to limit the amount of stacked sheets on the sample tray 701 in height in association with the area detecting sensor S703.

Also, the area flag F703*b* is disposed slightly above the sheet discharge port 618 of the intermediate tray 630 and designed so as to announce the upper limit position of the area which obstructs the sheet discharged from the intermediate tray 630 in association with the area detecting sensor S703.

The area flag F703*c* announces the lower limit position of the area which obstructs the sheet discharged from the intermediate tray 630 in association with the area detecting sensor S703.

An area flag F703*d* is a flag that limits the height of the sample tray 701 when the sample tray 701 receives the sheets from the intermediate tray 630, in association with the area detecting sensor S703, and is disposed on a position lower than an area flag F703*c* by a distance as long as the thickness of the about 1000 sheets.

An area flag F702*a* is a flag that announces the upper limit of the vertically moving area of the stack tray 700 when the stack tray 700 receives the sheet from the intermediate tray 630, in association with the area detecting sensor S702.

An area flag F702*b* is disposed on a position where about 1000 sheets can be stacked on stack tray 700 below the area flag F702*a*.

An area flag F702*c* is disposed on a position where about 2000 sheets can be stacked on stack tray 700 below the area flag F702*a*.

The area flag F702*d* is a flag that announces the lower limit of the vertically moving area of the stack tray 700 in association with the area detecting sensor S702.

Figure 34:
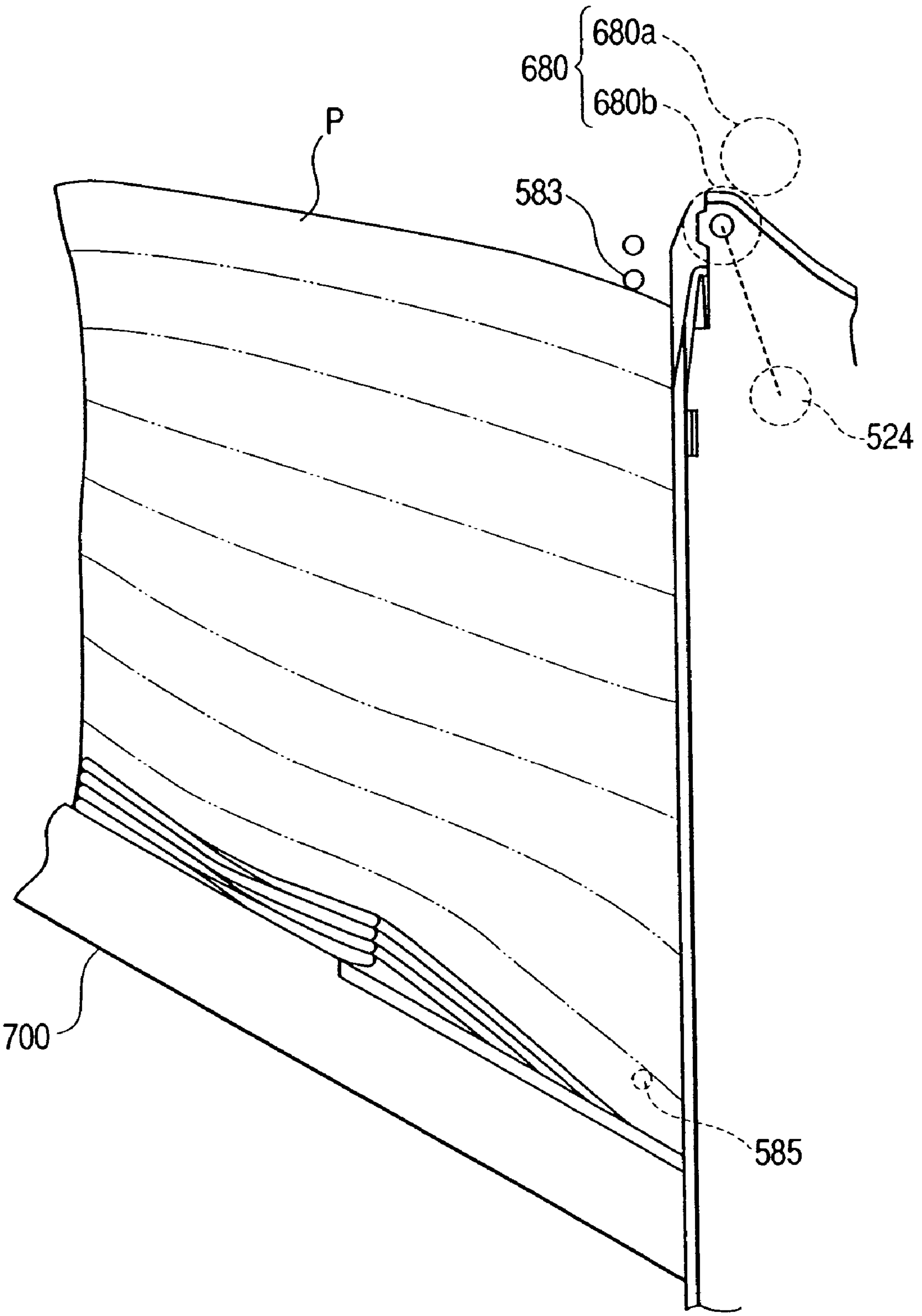
FIG. 34 is a diagram showing a state in which three-folded sheets and nonfolded sheets are mixedly stacked on the stack tray where the number of the three-folded sheets stacked thereon is small.

The respective trays of the sample tray 701, the stack tray 700 and the discharge tray 211 are equipped with discharge sheet detecting sensors 586, 585 and 584 which detect whether a sheet is stacked on the respective trays, or not, respectively, as shown in FIGS. 1 and 10, and the stack tray 700 is further equipped with a discharge sheet detecting sensor 583 as shown in FIG. 34.

(Flowcharts of Sample Tray 701 and Stack Tray 700)

Figure 28:
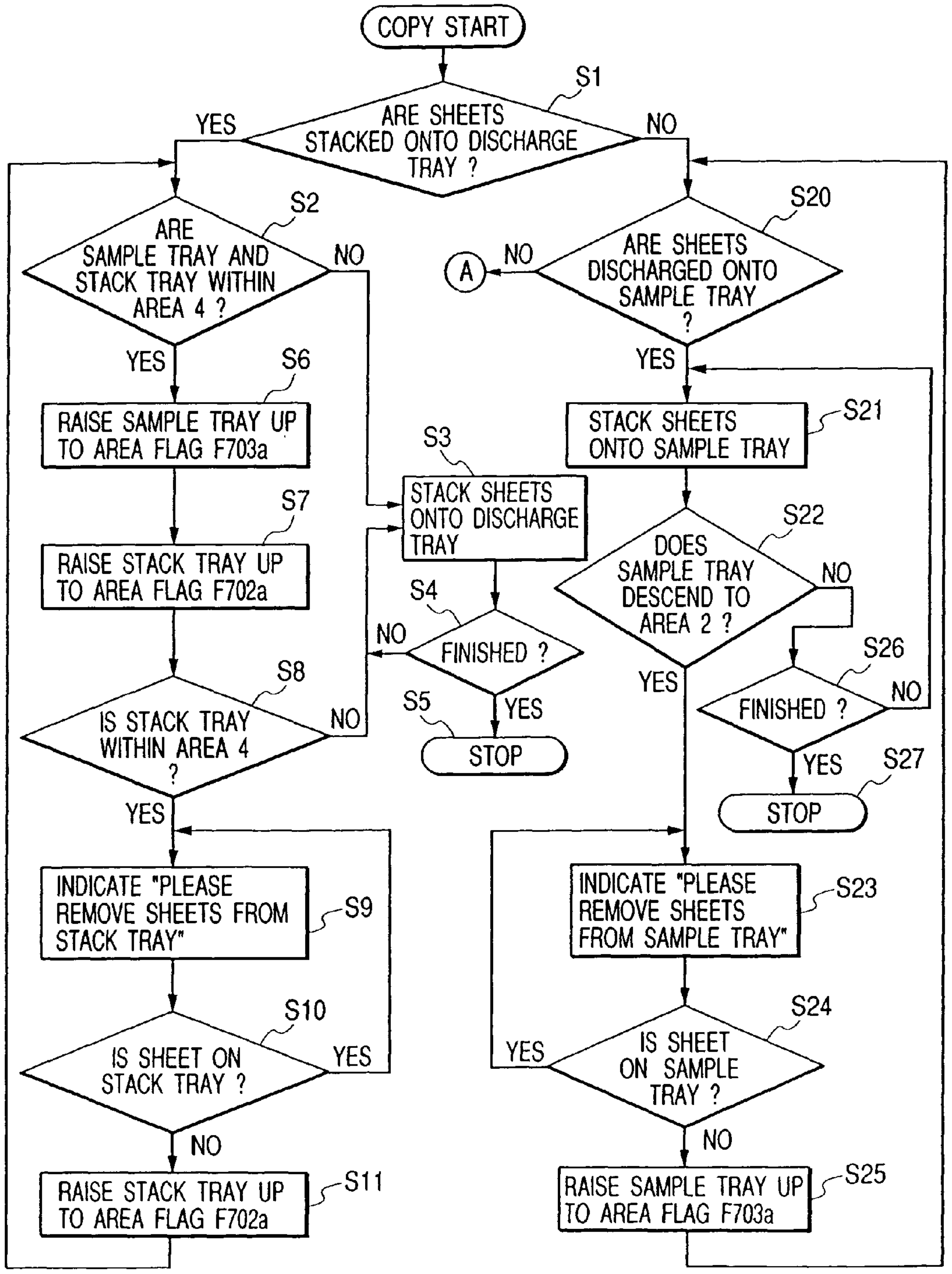
FIG. 28 is a flowchart for explanation of the ascent/descent operation of the sample tray and of the stack tray.
Figure 29:
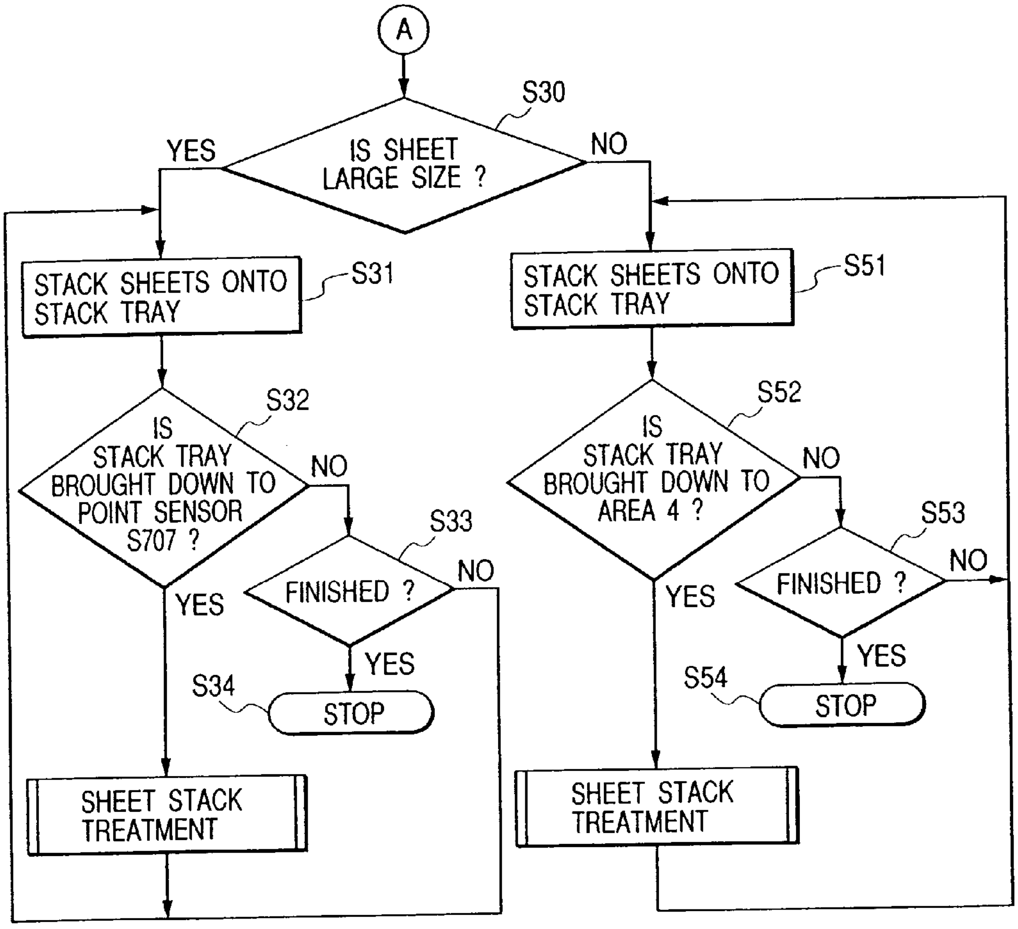
FIG. 29 is a flowchart for explanation of the ascent/descent operation of the sample tray and of the stack tray.
Figure 30:
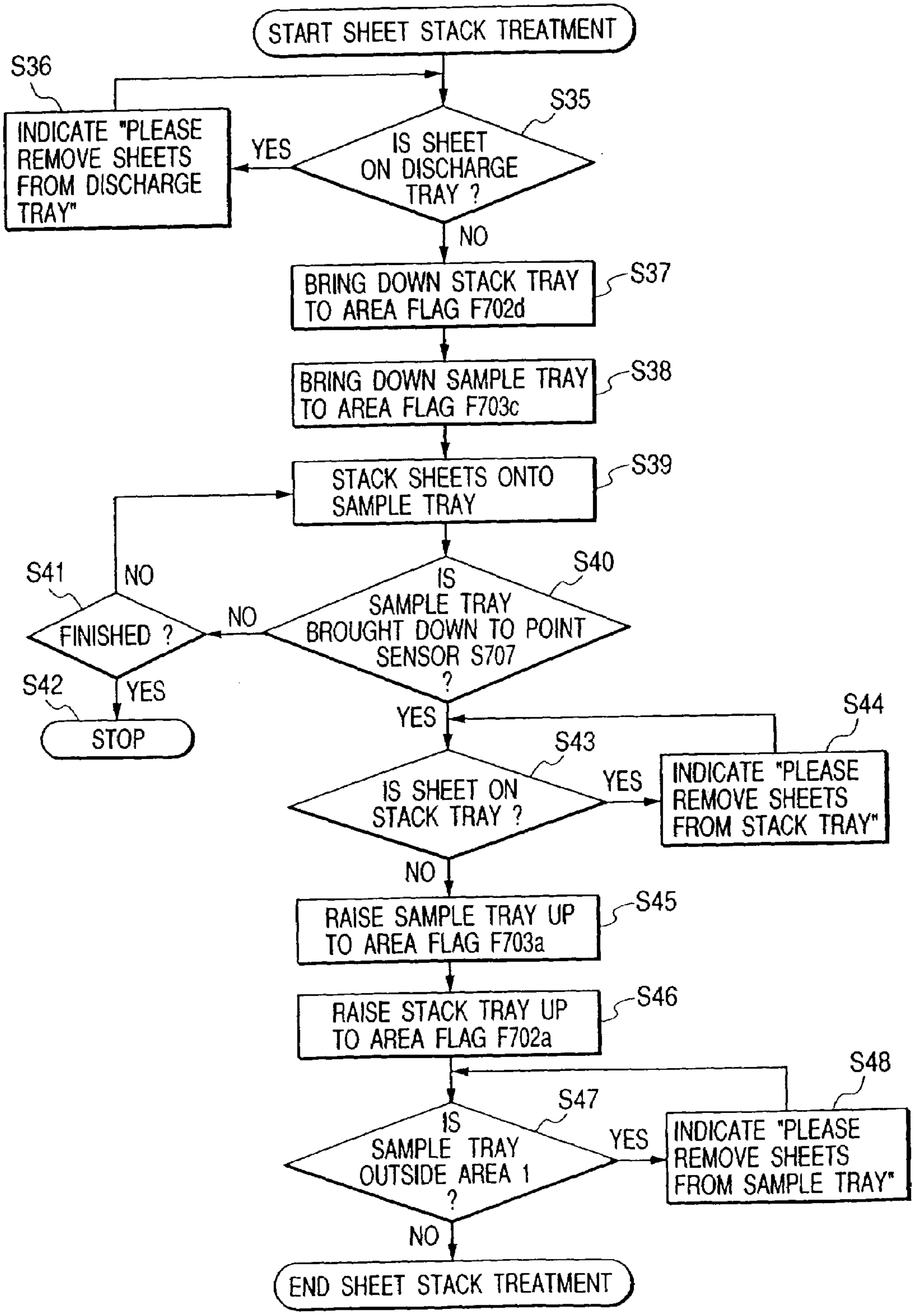
FIG. 30 is a flowchart for explanation of the ascent/descent operation of the sample tray and of the stack tray.

Subsequently, the vertically moving operation of the sample tray 701 and the stack tray 700 will be described with reference to the flowcharts shown in FIGS. 28, 29 and 30.

The vertically moving operation is conducted by the finisher controlling portion 525 which will be described later (refer to FIGS. 2 and 35).

It is assumed that an area between the area flag F703*a* and the area flag F703*b* is an area 1, an area between the area flag F703*b* and the area flag F703*c* is an area 2, an area between the area flag F702*a* and the area flag F702*c* is an area 3, and an area between the area flag F702*c* and the area flag F702*d* is an area 4 (refer to FIG. 27).

(Discharge of Sheets onto Discharge Tray 211)

First, in the case where the sheets are stacked on the discharge tray 211 (section 1, referred to simply as "S1"), the point sensor S707 and the area flag F706 detect whether the sample tray 701 is in the area 4, or not, that is, if the sample tray 701 is out of a movement range, or not, and the area flag F702*d* and the area detecting sensor S702 detect whether the stack tray 700 is in the area 4, or not (S2).

If the sample tray 701 and the stack tray 700 are out of the area 4, the sheets are discharged onto the discharge tray. The discharging operation is repeated until a given number of sheets are discharged (S4), and when the given number of sheets are discharged, the discharging operation onto the discharge tray 211 is completed (S5).

If the sample tray 701 and the stack tray 700 are in the area 4, both of the trays 701 and 700 are raised up to the area flag F703*a* and F702*a*, respectively, by the vertically moving motors 714 and 702 (refer to FIG. 26) (S6 and S7).

When the stack tray 700 becomes out of the area 4 (S8), the operation proceeds to S3, and the sheets are discharged onto the discharge tray 211 (S3).

If the stack tray 700 is in the area 4, the sheets are stacked onto the stack tray 700, and the user is instructed so as to remove the sheets from the stack tray (S9).

If the discharge sheet detecting sensor 585 (refer to FIGS. 1, 10 and 35) on the stack tray detects that the sheets have been removed from the stack tray 700 (S10), the stack tray is raised up to the area flag 702*a* (S11) before the sheets are stacked and discharged onto the discharge tray 211 (S3).

(Discharge of Sheets onto Sample Tray 701)

When the sheets are discharged onto the sample tray 701 from the sheet discharge portion 619 (S1, S20 and S21), the sample tray 701 descends with discharge of the sheets while receiving the sheets. When the sample tray 701 is brought down to the area 2 (S22), the sample tray 701 blocks the sheet discharge port 618 of the intermediate tray 630 so that the sheet bundle cannot be discharged onto the stack tray 700 from the intermediate tray 630. Therefore, the user is instructed so as to remove the sheets from the sample tray (S23). After the sheets have been removed from the sample tray (S24), the sample tray is raised up to the area flag F703*a* (S25). Then, the sheets can be again discharged onto the sample tray.

If the discharge of the sheets is finished while the sample tray 701 is descending down to the area 2, the sample tray 701 stops at that time, and the sheet discharging process is finished (S26, S27).

(Discharge of Large-Size Sheets onto Stack Tray 700)

The bound sheet bundle is mainly discharged from the intermediate tray 630 onto the stack tray 700.

When the sheets are discharged onto the stack tray 700 (S1 and S20), if the sheets are of large size in accordance with an instruction from the user (for example, A3 or B4 size) (S30), the stack tray is brought down to the point sensor S707 so that the sheets of the large size can be stacked onto the stack tray (S31 and S32). If the discharge of the sheets of the large size is completed while the stack tray is being brought down, the stack tray stops (S33 and S34).

When the stack tray 700 is brought down to the point sensor S707, about 1000 sheets of the large size are stacked onto the stack tray 700. In this situation, the discharge sheet detecting sensor 584 on the discharge tray 211 (refer to FIGS. 1, 10 and 35) detects that the sheets are stacked on the discharge tray 211 (S35), and the user is instructed so as to remove the sheets from the discharge tray 211 (S36). If no sheet is stacked onto the discharge tray 211, the stack tray 700 is brought down to the area flag F702*d* (S37).

Thereafter, the sample tray 701 is brought down to the area flag F703*c* (S38), and the sheets are stacked onto the sample tray 701 (S39). In addition, the sample tray 701 is brought down to the point sensor S707 while the sheets of the large size is being discharged (S40). If the discharge of the sheets is completed while the sample tray 701 is being brought down, the sample tray stops at that time (S41 and S42).

When the sample tray is brought down to the point sensor S707, if the sheets of the large size are stacked on the stack tray 700 (S43), the user is instructed so as to remove the sheets from the stack tray 700 (S44).

Thereafter, the sample tray and the stack tray are raised up to the area flags F703*a* and F702*a* (S45 and S46).

However, if the sheets are stacked on the sample tray 701, the sample tray 701 is not raised from the area 3, both the sample tray 701 and the stack tray 700 are not raised. For that reason, the sheets are removed from the sample tray 701 by the user (S47 and S48).

(Discharge of Sheets of Regular Size onto Stack Tray 700)

When the sheets are discharged onto the stack tray 700 (S1 and S20), if the sheets are of the regular size (for example, A4 or B5 size) in accordance with an instruction from the user (S30), the stack tray is brought down to the area 4 so that the sheets of the regular size can be stacked onto the stack tray (S51 and S52). If the discharge of the sheets of the regular size is completed while the stack tray is being brought down, the stack tray stops (S53 and S54).

When the stack tray 700 is brought down to the lower region of the area 3, about 2000 sheets of the regular size are stacked onto the stack tray 700. In this situation, if the discharge sheet detecting sensor 584 detects that the sheets are stacked on the discharge tray 211 (S35), the user is instructed so as to remove the sheets from the discharge tray 211 (S36). If no sheet is stacked onto the discharge tray 211, the stack tray 700 is brought down to the area flag F702*d* (S37). As a result, 3000 sheets are stacked onto the stack tray 700.

Thereafter, the sample tray 701 is brought down to the area flag F703*c* (S38), and the sheets are stacked onto the sample tray 701 (S39). In addition, the sample tray 701 is brought down to the point sensor S707 while the sheets of the regular size are being discharged (S40). If the discharge of the sheets of the regular size is completed while the sample tray 701 is being brought down, the sample tray stops at that time (S41 and S42).

When the sample tray is brought down to the point sensor S707, if the sheets of the regular size are stacked on the stack tray 700 (S43), the user is instructed so as to remove the sheets from the stack tray 700 (S44).

Thereafter, the sample tray and the stack tray are raised up to the area flags F703*a* and F702*a* (S45 and S46).

However, if the sheets are stacked on the sample tray 701, the sample tray 701 is not raised from the area 3, both the sample tray 701 and the stack tray 700 are not raised. For that reason, the sheets are removed from the sample tray 701 by the user (S47 and S48).

(The Number of Sheets Stacked onto Sample Tray and Stack Tray)

In the above-described raising/descending of the sample tray 701, when the sample tray 701 is brought down to the area flag F703*b*, about 1000 sheets of the regular size can be stacked onto the sample tray 701, and when the sample tray 701 is brought down to the area flag F703*c*, about 2000 sheets of the regular size can be stacked onto the sample tray 701, and about 1000 sheets of the large size can be stacked onto the sample tray 701. In addition, when the sample tray 701 is brought down to the area flag F703*d*, about 3000 sheets of the regular size can be stacked onto the sample tray 701. Also, when the sample tray 701 is brought down to the area flag F703*d*, about 1000 sheets bound and discharged from the intermediate tray 630 can be stacked onto the sample tray 701.

Also, when the stack tray 700 is brought down to the area flag F702*b*, about 1000 sheets of the regular size as bound can be stacked onto the stack tray 700, and when the stack tray 700 is brought down to the area flag F702*c*, about 2000 sheets of the regular size as bound can be stacked onto the stack tray 700 and about 1000 sheets of the large size as bound can be stacked onto the stack tray 700. Further, when the stack tray 700 is brought down to the area flag F702*d*, about 3000 sheets of the regular size as bound can be stacked onto the stack tray 700.

Accordingly, when the sample tray 701 is brought down to the area flag F703*b*, and the stack tray is brought down to the area flag F702*c*, the sheets of about 3000 in total can be stacked on those trays.

Also, when the sample tray 701 is brought down to the area flag F703*d*, and the stack tray is brought down to the area flag F702*d*, the bound sheets of about 3000 in total can be stacked on those trays.

Further, when the stack tray 700 is brought down to the area flag F702*d*, about 3000 sheets of the regular size can be stacked on the stack tray 700.

The sample tray 701 and the stack tray 700 are positionally detected by the respective sensors, flags, etc., and controlled by the finisher controlling portion 525, etc., so that the respective trays 701, 700 and 211 do not interfere with each other.

(Open/Close of Sheet Discharge Port 611 of Discharge Tray 211)

Figure 31:
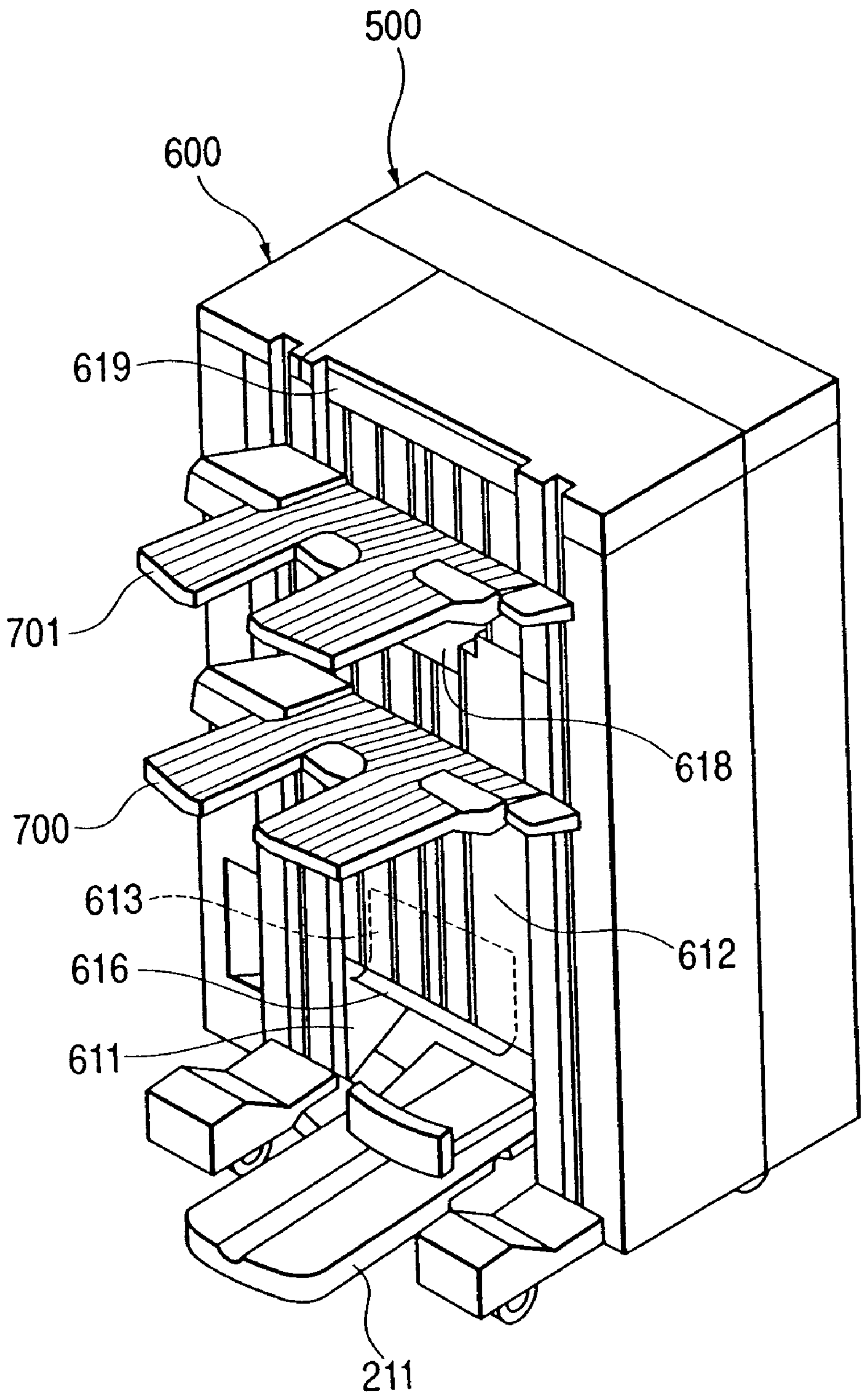
FIG. 31 is a perspective view showing a finisher.

As shown in FIGS. 1, 31 and 32, in the above-described operation, when the stack tray 700 is brought down, the sheet discharge port 611 of the discharge tray 211 is closed by a shutter 613 so that the sheets on the stack tray 700 do not enter into the sheet discharge port 611, as a result of which a large number of sheets can be stacked onto the stack tray 700.

The shutter 613 is so disposed as to be movable vertically by a pair of guide plates 614 located inside of an outer wall 612, and normally drawn upward by two extension springs 615 to open the sheet discharge port 611.

When the stack tray 700 is brought down, the lower end of the stack tray is abutted against a tray receiver 616 formed by bending the lower end of the shutter 613 outwardly, and the shutter 613 is brought down integrally with the stack tray 700 against those two extension springs 615.

When the stack tray 700 is raised, the shutter 613 is pulled by the extension springs 615 and raised while following the stack tray 700, to thereby open the sheet discharge port 611.

When the stack tray 700 is brought down and the shutter 613 closes the sheet discharge port 611, if the discharge tray 211 is projected from the sheet discharge port 611, the descending operation of the stack tray 700 is obstructed by the discharge tray 211. For that reason, the discharge tray 211 is so adapted as to move to a home position (a position shown in FIG. 1) by a discharge tray movement motor 617 shown in FIG. 35.

(Operation of Sample Tray 701 and Sub-Tray 620)

In the case where three-fold sheets which have not been bound are stacked onto the stack tray 700, because the folded portion of the sheets is positioned on the distal end side of the stack tray 700, the folded portion is swelled up, thereby making it difficult to discharge a subsequent three-fold sheet.

Figure 33:
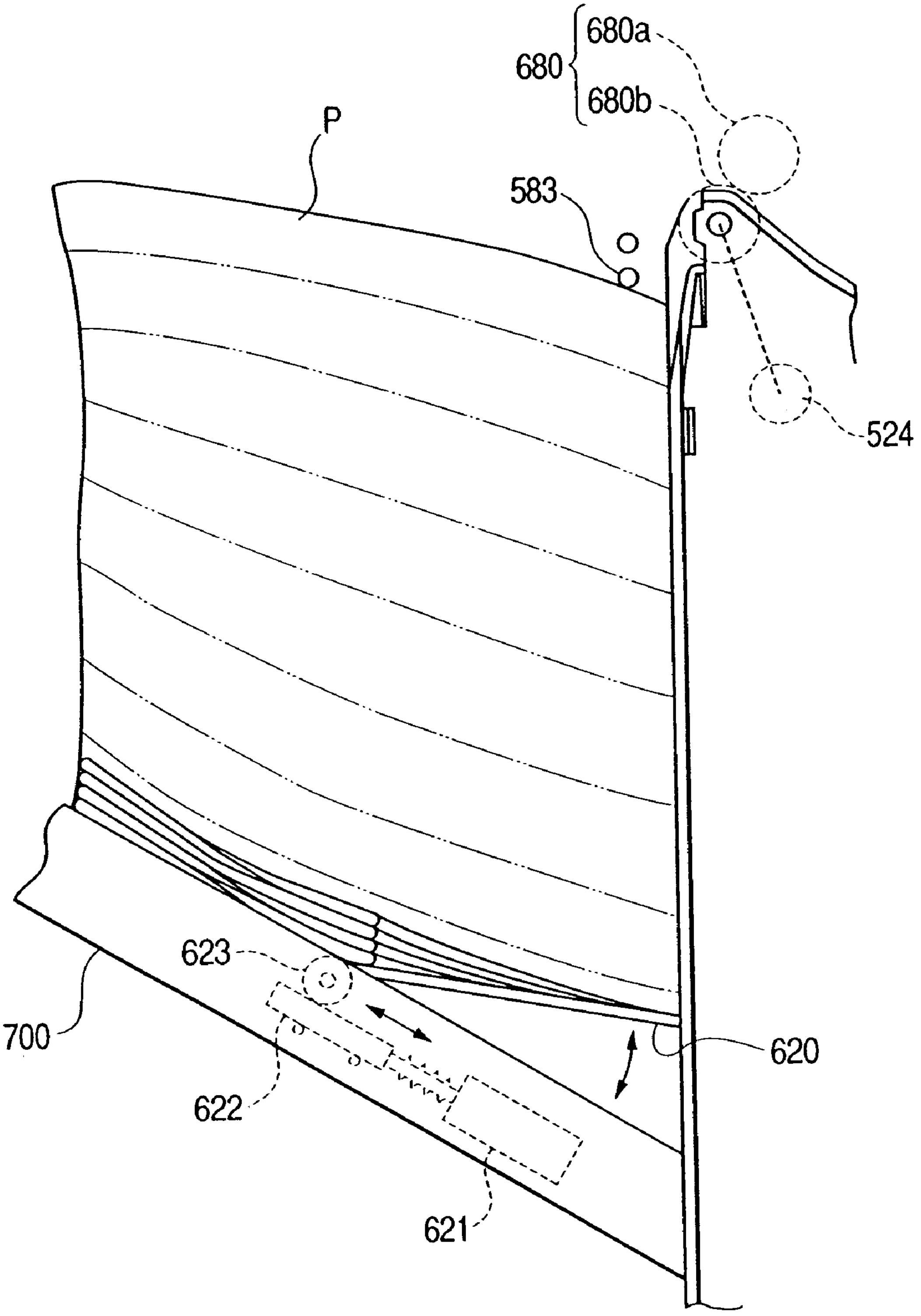
FIG. 33 is a diagram showing a state in which three-folded sheets and nonfolded sheets are mixedly stacked on the stack tray where the number of the three-folded sheets stacked thereon is large.

Under the above circumstances, as shown in FIG. 33, a sub-tray 620 disposed on the proximal side of the stack tray 700 is raised to lift up a side of the sheet which is not folded so that the three-fold sheet is made as horizontal as possible. Then, the entire stack tray 700 is brought down as much as the sub-tray 620 is raised, thereby making it easy to discharge the sheet.

If a two-fold mode is selected by the operating portion 303, the finisher controlling portion 525 (refer to FIGS. 2 and 35) actuates a plunger 621 (refer to FIG. 33) so as to vertically move and tilt the sub-tray 620 by a rack 622 and a pinion 623 (the vertically moving operation may be made by a link mechanism).

In this case, the sub-tray 620 may be vertically moved and tilted by a counter not shown which counts the three-fold sheets without detecting the sheets by the discharge sheet detecting sensor 583.

The sub-tray 620 is designed in such a manner that the end of the sub-tray 620 on the proximal side of the stack tray 700 (the upstream side in the sheet discharge direction) is vertically tilted pivotally about the other end of the sub-tray 620 on the upper intermediate position of the stack tray 700 as a base end.

Also, in the case where non-fold sheets (sheet of a small size called "straight sheet") and three-fold sheets are mixedly stacked onto the stack tray 700 in a non-binding mode, if the ratio of the three-fold sheets to the straight sheets (called "mixture stack ratio") is lower than a given value, for example, if the mixture stack ratio is lower than 5% where the number of straight sheets is 95 whereas the number of three-fold sheets is 5, the folded portion of the sheets is hardly swelled, and if the sub-tray 620 is raised, the proximal side of the stack tray 700 of the sheets becomes heightened. Therefore, in the case where the straight sheet is a downward curl sheet (a sheet curled in an inverted U-shape), the sheets are liable to slide and drop from the distal side of the stack tray 700.

In the above-described case, when the sheets are discharged onto the stack tray, the sub-tray 620 is brought down to make the proximal side of the stack tray low in level so that the most top sheet is always substantially horizontal, or the proximal side of the stack tray is always low, as shown in FIG. 34.

With the above-described structure, the distal side of the stack tray of the sheets becomes high in level, and even if the sheet is a downward curl sheet, there is no case in which the sheets slide and drop from the distal side of the stack tray.

The tilting and vertically moving operation of the sub-tray 620 is automatically conducted by the finisher controlling portion 525 (refer to FIGS. 2 and 35) on the basis of the mixture stack ratio of the non-fold sheets and the three-fold sheets which are previously stored.

That is, the finisher controlling portion 525 compares a mixture stack ratio based on the number of non-fold sheets and the number of three-fold sheets which is inputted by selecting the non-binding mode through the operating portion 303 (refer to FIG. 2) by the user, with a mixture stack ratio which is previously inputted to the finisher controlling portion 525, and if the previously inputted mixture stack ratio is smaller (for example, a case of over 5%), the sub-tray 620 is at the descent position whereas if the previously inputted mixture stack ratio is larger (for example, a case of 5% or less), the sub-tray 620 is at a raised position.

The sub-tray 620 may be descended in accordance with the mixture stack ratio after being moved upward and tilted in advance, regardless of the number of sheets, when the three-fold sheets are discharged, or may be raised in accordance with the mixture stack ratio after being moved downward in advance.

Also, a sub-tray may be disposed on not only the stack tray 700 but also the sample tray 701 so as to be adaptive to the mixedly stacked sheets.

In addition, in the case where the sub-tray 620 is not disposed on the sample tray 701, when the three-fold sheet is discharged, if the thickness of the sheet is thin and the sheet is weak in rigidity, the leading end of the three-fold sheet is heavy in weight. Therefore, if the speed of discharging the sheets from the sheet discharge port 619 (refer to FIG. 1) due to the pair of discharge rollers 509 is low, the leading end of the sheet goes out of the sheet discharge port 619, and the sheet is not advanced but stays on one location, as a result of which the discharge of the sheet becomes incomplete. On the contrary, if the speed of discharging the sheets due to the pair of discharge rollers 509 is too high, the sheet may be forcibly rushed out from the sample tray 701 and drop. For that reason, when the instruction of three-folding of a thin sheet is inputted to the operating portion 303 (refer to FIG. 2) by the user, the finisher controlling portion 525 (refer to FIG. 35) which will be described later controls the rotating speed of the motor 523 for the pair of discharge rollers which rotates the pair of discharge rollers 509 so that the sheet can be discharged at the optimum speed to the thin three-fold sheet.

As a result, even in the case where the thin and weak rigidity sheet are folded into three, the sheet can be surely discharged and stacked on the tray.

(Finisher Controlling Portion 525)

Figure 35:
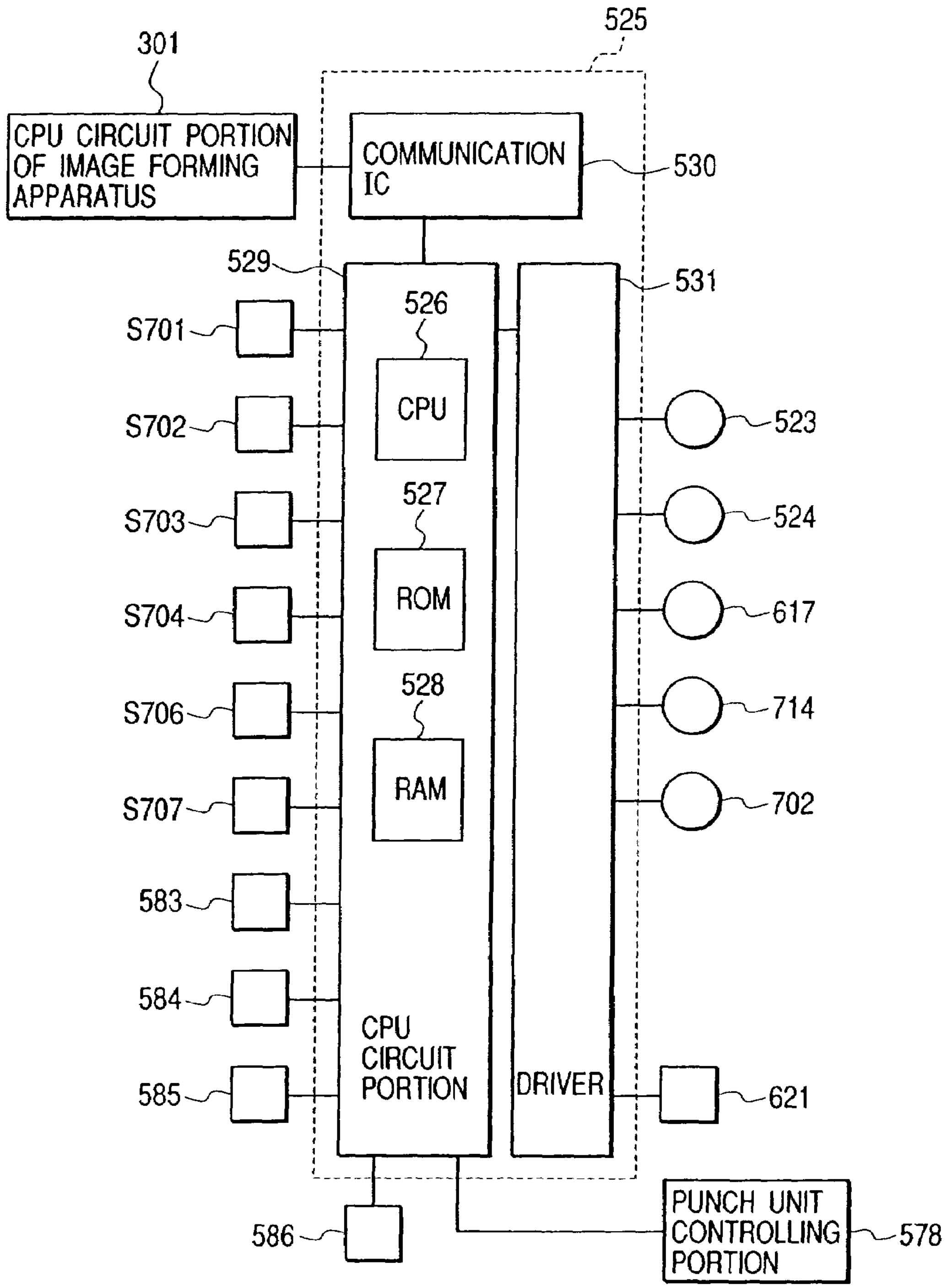
FIG. 35 is a block diagram illustrating the control of the finisher.

Referring to FIG. 35, the finisher controlling portion 525 is a control circuit that controls the finisher 600.

The finisher controlling portion 525 includes a CPU circuit portion 529 made up of a CPU 526, a ROM 527, a RAM 528 and so on. The CPU circuit portion 529 communicates with a CPU circuit portion 301 disposed on a main body side of the copying machine through a communication IC 530 to convert data, and executes various programs stored in the ROM 527 on the basis of an instruction from the CPU circuit portion 529 to conduct the drive control of the finisher 600.

When the drive of the finisher 600 is controlled, detection signals are inputted to the CPU circuit portion 529 from various sensors. Those various sensors may include the idling detecting sensor S701, the area detecting sensor S702, the area detecting sensor S703, the upper limit sensor S704, the point sensor S706, the point sensor S707, etc.

The CPU circuit portion 529 is connected with a driver 531, and the driver 531 is adapted to drive the various motors and a solenoid on the basis of the signals from the CPU circuit portion 529.

The various motors may include the motor 523 for the pair of discharge rollers, the motor 524 for the pair of discharge rollers, the movement motor 617, the sample tray vertically moving motor 714, the stack tray vertically moving motor 702, etc. The solenoid may include the sub-tray plunger 621, etc.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A sheet punching device, which cuts holes in a sheet conveyed at predetermined intervals while punches are entering die holes, said sheet punching device comprising:

a plurality of punch trains, each of which includes a plurality of said punches axially aligned on a rotating shaft and projecting in a radial direction of said shaft; and a plurality of initial position detecting sensors, which are disposed in correspondence with said plurality of punch trains respectively, and detect an initial position of each of said plurality of punch trains in a rotation direction of said shaft, wherein said plurality of punch trains are disposed with a phase difference in the rotation direction of said shaft relative to one another, and said die holes are disposed in correspondence with said plurality of punches, wherein one of said plurality of punch trains is selectively used in cutting holes in the sheet at a predetermined timing corresponding to sheet conveyance intervals, and wherein one of said plurality of punch trains selected for use, is set at the initial position based on a signal from said plurality of initial position detecting sensors.

2. A sheet punching device according to claim 1, further comprising a sheet end detecting sensor, which detects an end of the sheet.

3. A sheet punching device according to claim 1, wherein said plurality of punches and said die holes are rotated in synchronism with each other to cut holes in the sheet.

4. A sheet punching device according to claim 2, wherein after said sheet end detecting sensor detects a trailing end of the sheet, one of said plurality of punch trains cuts holes in the vicinity of the trailing end of the sheet based on signals from said sheet end detecting sensor.

5. A sheet punching device according to claim 1, wherein numbers of said plurality of punches in said plurality of punch trains are different from each other.

6. A sheet punching device, which punches holes in a sheet conveyed at predetermined intervals while punches are entering die holes, said sheet punching device comprising:

a first rotatable shaft;

a plurality of punch trains disposed on said first shaft, wherein each of said plurality of punch trains includes a plurality of punches extending radially from said first shaft, and wherein said plurality of punches are arranged in parallel with one another in an axial direction of said first shaft;

a plurality of initial position detecting sensors, which are disposed in correspondence with said plurality of punch trains respectively, and detect an initial position of each of said plurality of punch trains in a rotation direction of said first shaft;

a second rotatable shaft; and a plurality of die holes disposed on said second shaft, wherein one of said plurality of punch trains is selectively used in cutting holes in the sheet at a predetermined timing corresponding to sheet conveyance intervals, and wherein said one of said plurality of punch trains selected for use, is set at the initial position based on a signal from said plurality of initial position detecting sensors.

7. A sheet punching device according to claim 6, further comprising a sheet end detecting sensor which detects an end of the sheet.

8. A sheet punching device according to claim 6, wherein said plurality of punches and said plurality of die holes are rotated in synchronism with each other to cut holes in the sheet.

9. A sheet punching device according to claim 7, wherein after said sheet end detecting sensor detects a trailing end of the sheet, one of said plurality of punch trains cuts holes in the sheet in the vicinity of the trailing end of the sheet based on signals from said sheet end detecting sensor.

10. A sheet punching device according to claim 6, wherein numbers of said plurality of punches in said plurality of punch trains are different from each other.

* * * * *

UNITED STATES PATENT AND TRADEMARK OFFICE

CERTIFICATE OF CORRECTION

PATENT NO. : 7,090,120 B2 Page 1 of 1
APPLICATION NO. : 10/654986
DATED : August 15, 2006
INVENTOR(S) : Noriyoshi Ueda et al.

It is certified that error appears in the above-identified patent and that said Letters Patent is hereby corrected as shown below:

<u>COLUMN 7</u>:
Line 15, “reverted,” should read --reversed,--.

<u>COLUMN 8</u>:
Line 23, “looped-portion” should read --looped portion--.

<u>COLUMN 9</u>:
Line 61, “widthwise” should read --width--.
Line 67, “widthwise” should read --width--.

<u>COLUMN 10</u>:
Line 10, “widthwise” should read --width--.
Line 50, “another” should read --the other--.

<u>COLUMN 16</u>:
Line 22, “discharges and drops” should read --discharge and drop--.

<u>COLUMN 17</u>:
Line 20, “operation” should read --operations--.

<u>COLUMN 19</u>:
Line 23, “sprig 706” should read --spring 706--.
Line 34, “of” should be deleted.

<u>COLUMN 21</u>:
Line 52, “is” should read --are--.

Signed and Sealed this

Seventeenth Day of April, 2007

JON W. DUDAS
*Director of the United States Patent and Trademark Office*